United States Patent
Kim et al.

(10) Patent No.: US 12,487,717 B2
(45) Date of Patent: Dec. 2, 2025

(54) DISPLAY DEVICE

(71) Applicant: Samsung Display Co., Ltd., Yongin-Si (KR)

(72) Inventors: Yun Ho Kim, Yongin-si (KR); Jin Woo Kim, Yongin-si (KR); Jae Uk Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/544,513

(22) Filed: Dec. 19, 2023

(65) Prior Publication Data

US 2024/0377914 A1 Nov. 14, 2024

(30) Foreign Application Priority Data

May 10, 2023 (KR) .................. 10-2023-0060553

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 3/0443* (2019.05); *G06F 2203/04108* (2013.01)

(58) Field of Classification Search
CPC ..... G06F 3/0416; G06F 3/0414; G06F 3/0446
USPC ................................. 345/173, 174
See application file for complete search history.

(56) References Cited

U.S. PATENT DOCUMENTS

| | | | |
|---|---|---|---|
| 9,921,739 B2 | 3/2018 | Dorfner | |
| 9,927,933 B2* | 3/2018 | Heim | G06F 3/017 |
| 10,459,623 B2 | 10/2019 | Hoch et al. | |
| 10,592,028 B2* | 3/2020 | Clark | H10K 59/131 |
| 11,086,434 B2* | 8/2021 | Han | G06F 3/0446 |

FOREIGN PATENT DOCUMENTS

EP 2695044 B1 6/2022

OTHER PUBLICATIONS

Microchip Technology Inc., "GestIC® Design Guide", 2013-2016, DS40001716C, Arizona, USA.

\* cited by examiner

*Primary Examiner* — Calvin C Ma
(74) *Attorney, Agent, or Firm* — Innovation Counsel LLP

(57) ABSTRACT

A display device includes a display layer disposed on a substrate. The display layer includes a light emitting elements. A sensor is disposed on the display layer. Sensing lines of the sensor are disposed outside touch electrodes of the sensor and are electrically connected to the touch electrodes. A gesture sensor electrode of the sensor is disposed outside the sensing lines. In a plan view, the gesture sensor electrode does not overlap a conductor which provide a constant voltage to the light emitting elements.

21 Claims, 13 Drawing Sheets

DISPLAY DEVICE

This application claims priority to Korean Patent Application No. 10-2023-0060553, filed on May 10, 2023, and all the benefits accruing therefrom under 35 U.S.C. § 119, the content of which in its entirety is herein incorporated by reference.

BACKGROUND

1. Field

The disclosure relates to a display device.

2. Description of the Related Art

A display device may include a display unit for displaying an image and a sensor unit for sensing a touch position. The sensor unit may be used to measure a coordinate of a touch position of an object and may be used to check proximity and motion of the object.

SUMMARY

An object of the disclosure is to provide a display device capable of accurately sensing proximity and/or motion of an object.

Objects of the disclosure are not limited to the objects described above, and other technical objects which are not described will be clearly understood by those skilled in the art from the following description.

According to embodiments of the disclosure, a display device includes a display layer including light emitting elements disposed on a substrate, and a sensor disposed on the display layer. The sensor includes touch electrodes, sensing lines disposed outside the touch electrodes and electrically connected to the touch electrodes, and a gesture sensor electrode disposed outside the sensing lines. In a plan view, the gesture sensor electrode does not overlap a conductor which provide a constant voltage to the light emitting elements.

The touch electrodes and the sensing lines may overlap the conductor which provide the constant voltage to the light emitting elements in a plan view.

The conductor which provide the constant voltage to the light emitting elements may be a cathode electrode of the light emitting elements or a power line electrically connected to the cathode electrode.

The touch electrodes, the sensing lines, and the gesture sensor electrode may be disposed on the same layer.

The display layer may further include transistors, and at least one of the transistors may be electrically connected to the light emitting elements, and the cathode electrode and the power line may be disposed between the transistors and the sensor to cover the transistors.

In a plan view, the gesture sensor electrode may not overlap the transistors.

In a plan view, the gesture sensor electrodes may be respectively disposed on an upper side, a lower side, a left side, and a right side of a sensing area where the touch electrodes are disposed.

The display device may further include a sensing driver, and the sensing driver may sense proximity or motion of an object based on a change in a first capacitance between at least one of the touch electrodes and the gesture sensor electrode.

The gesture sensor electrode may include a first sensor electrode and a second sensor electrode disposed on the first sensor electrode to overlap the first sensor electrode in a plan view.

The second sensor electrode may be completely overlapped with the first sensor electrode in a plan view.

The display device may further include a sensing driver, and the sensing driver may sense proximity or motion of an object based on a change in a second capacitance between the first sensor electrode and the second sensor electrode.

The sensing driver may apply the same signal to at least one of the touch electrodes and the first sensor electrode, and the sensing driver senses the proximity or the motion of the object based a total change in the second capacitance between the first sensor electrode and the second sensor electrode, and the first capacitance between at least one of the touch electrodes and the second sensor electrode.

The sensor may further include an auxiliary electrode disposed under the touch electrodes and spaced apart from the first sensor electrode, and the same signal may be applied to the auxiliary electrode and the first sensor electrode.

The display device may further include a sensing driver, and the sensing driver may sense proximity or motion of an object based on a total change in a second capacitance between the first sensor electrode and the second sensor electrode, and a third capacitance between the auxiliary electrode and the second sensor electrode.

The auxiliary electrode may be entirely disposed on the substrate as one electrode, and may overlap all of the touch electrodes in a plan view.

At least one of the touch electrodes may be connected through a bridge, and the auxiliary electrode may be disposed on the same layer as the bridge.

According to embodiments of the disclosure, a display device includes a display layer disposed on a substrate and including transistors, light emitting elements, and a power line connected to a cathode electrode of the light emitting elements, and a sensor disposed on the display layer. The sensor includes a gesture sensor electrode for sensing proximity or motion of an object. In a plan view, the gesture sensor electrode does not overlap the transistor, the cathode electrode, and the power line.

The gesture sensor electrode may include a first sensor electrode and a second sensor electrode disposed on the first sensor electrode to overlap the first sensor electrode in a plan view.

The second sensor electrode may be completely overlapped with the first sensor electrode in a plan view.

The sensor may further include an auxiliary electrode spaced apart from the first sensor electrode and overlapping the cathode electrode in a plan view, and the same signal may be applied to the auxiliary electrode and the first electrode.

Details of other embodiments are included in the detailed description and drawings.

The display device according to embodiments of the disclosure may include the touch sensor and the gesture sensor disposed on the display layer, the touch sensor may overlap the cathode electrode in the display layer, and the gesture sensor may not overlap the cathode electrode in the display layer. The cathode electrode may improve touch sensing sensitivity of the touch sensor by shielding a structure under the cathode electrode. The gesture sensor that does not overlap the cathode electrode may have a relatively small capacitance (or base capacitance), may more accurately sense the proximity and the motion of the object, and may sense an object positioned farther away from the display device.

An effect according to embodiments is not limited by the contents exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
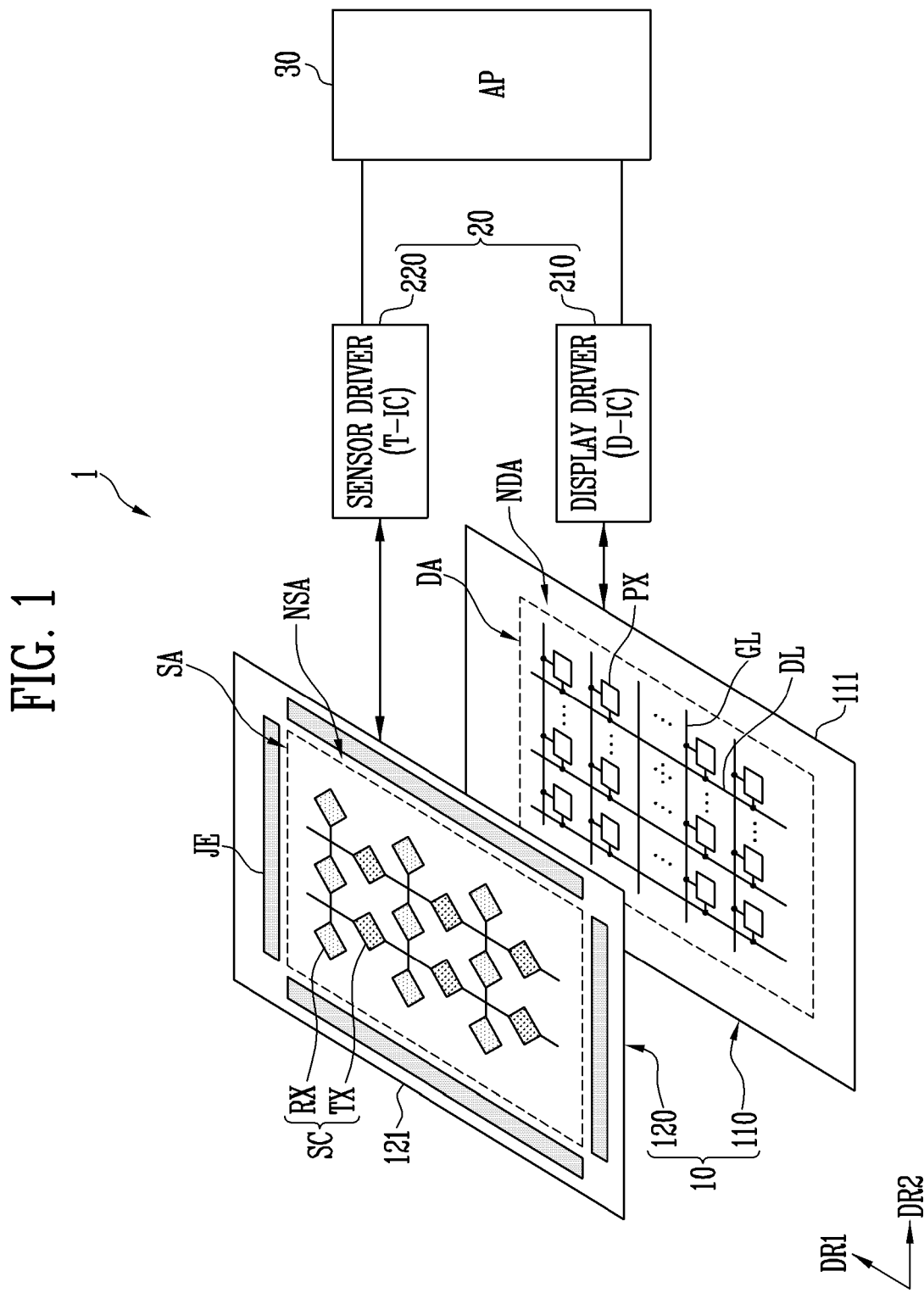
FIG. 1 is a diagram illustrating a display device according to embodiments of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of other embodiments.

FIG. 1 is a diagram illustrating a display device according to embodiments of the disclosure.

Referring to FIG. 1, the display device 1 may be applied to an electronic device such as a computer, a laptop computer, a cellular phone, a smart phone, a personal digital assistant (PDA), a portable multimedia player (PMP), a digital TV, a digital camera, a portable game console, a navigation device, a wearable device, an internet of things (IoT) device, an internet of everything (IoE) device, an e-book, a virtual reality (VR) device, an augmented reality (AR) device, a vehicle navigation device, a video phone, a surveillance system, an automatic focus system, a tracking system, or a motion sensing system.

The display device 1 may include a panel 10 and a driving circuit unit 20 for driving the panel 10. In addition, the display device 1 may further include a processor 30 or may be connected to the processor 30.

The panel 10 may include a display unit 110 (or a display panel) and a sensor unit 120 (a sensor panel, or a sensor). The display unit 110 may display an image. The sensor unit 120 may sense (or detect) an external input such as touch, pressure, fingerprint, hovering, proximity, and motion. For example, the panel 10 may include pixels PX, touch sensors SC (or first sensors) positioned to overlap at least some of the pixels PX, and gesture sensors JE (proximity sensors, motion sensors, or second sensors) which do not overlap the pixels PX. In an embodiment, the touch sensors SC may include first touch sensors TX (or touch driving electrodes) and second touch sensors RX (or touch sensing electrodes). In another embodiment (for example, a self-capacitance method), the touch sensors SC may be configured as one type of sensors without distinction between the first and second touch sensors TX and RX.

The driving circuit unit 20 may include a display driver 210 for driving the display unit 110 and a sensor driver 220 for driving the sensor unit 120. The pixels PX may display an image in a display frame period unit. The touch sensors SC may sense a touch input of an object (for example, a user's finger or a stylus pen) in a touch sensing frame period unit. The gesture sensors JE may sense proximity, motion, or the like of the object in a proximity sensing frame period unit. In an embodiment, a touch sensing frame period and a proximity sensing frame period may be independent of each other or may be different from each other. For example, touch sensing using the touch sensors SC and proximity sensing using at least gesture sensors JE may be performed in a time division manner. In another embodiment, the touch sensing frame period and the proximity sensing frame period may overlap each other. For example, the touch sensing using the touch sensors SC and the proximity sensing (or the motion sensing) using the gesture sensors JE may be simultaneously performed. The touch sensing frame period and the proximity sensing frame period may be included in one sensing frame period, but are not limited thereto. The sensing frame period and the display frame period may be independent of each other or may be different from each other. The sensing frame period and the display frame period may be synchronized or asynchronous with each other.

According to an embodiment, the display unit 110 and the sensor unit 120 may be separately manufactured, and then disposed and/or combined so that at least one area overlaps each other. In another embodiment, the display unit 110 and the sensor unit 120 may be integrally manufactured. For example, the sensor unit 120 may be directly formed on the display unit 110 (for example, on an upper substrate and/or on a lower substrate of the display panel, or on a thin film encapsulation layer), or on other insulating layers or on various functional layer (for example, an optical layer or a protective layer).

Meanwhile, in FIG. 1, the sensor unit 120 is disposed on a front surface (for example, an upper surface on which an image is displayed) of the display unit 110, but a position of the sensor unit 120 is not limited thereto. For example, the sensor unit 120 may be disposed on a back surface or both surfaces of the display unit 110. As another example, the sensor unit 120 may be disposed on at least one edge area of the display unit 110.

The display unit 110 may include a display substrate 111 (or a substrate) and a plurality of pixels PX formed on the display substrate 111. The pixels PX may be disposed in a display area DA of the display substrate 111.

The display substrate 111 may include the display area DA where an image is displayed and a non-display area NDA outside the display area DA. According to an embodiment, the display area DA may be disposed in a center area of the display unit 110, and the non-display area NDA may be disposed in an edge area of the display unit 110 to surround the display area DA.

The display substrate 111 may be a rigid substrate or a flexible substrate, and a material or a physical property thereof is not particularly limited. For example, the display substrate 111 may be a rigid substrate formed of glass or tempered glass, or a flexible substrate formed of a thin film of a plastic or metal material.

Scan lines GL and data lines DL, and pixels PX connected to the scan lines GL and the data lines DL may be disposed in the display area DA. The pixels PX may be selected by a scan signal of a turn-on level supplied from the scan lines GL, receive a data signal from the data lines DL, and emit light of a luminance corresponding to the data signal. Therefore, an image corresponding to the data signal may be displayed in the display area DA. In the disclosure, a structure, a driving method, and the like of the pixels PX are not particularly limited. For example, each of the pixels PX may be implemented as a pixel employing various currently known structures and driving methods.

In the non-display area NDA, various lines and/or a built-in circuit unit connected to the pixels PX of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, a light emitting element of each of the pixels PX may include an organic light emitting diode, an inorganic light emitting diode, a quantum dot/well light emitting diode, or the like. According to an embodiment, a plurality of light emitting elements may be provided in each of the pixels PX. The plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 may include a sensor substrate 121, and the touch sensors SC and the gesture sensors JE formed on the sensor substrate 121. The touch sensors SC may be disposed in a touch sensing area SA (or a sensing area) on the sensor substrate 121. The gesture sensors JE may be disposed in a peripheral area NSA.

The sensor substrate 121 may include the touch sensing area SA capable of sensing a touch input and the like, and the peripheral area NSA outside the touch sensing area SA. According to an embodiment, the touch sensing area SA may be disposed to overlap at least one area of the display area DA. For example, the touch sensing area SA may be set as an area corresponding to the display area DA (for example, an area overlapping the display area DA), and the peripheral area NSA may be set as an area corresponding to the non-display area NDA (for example, an area overlapping the non-display area NDA). In this case, when the touch input or the like is provided on the display area DA, the touch input may be detected through the sensor unit 120.

The sensor substrate 121 may be a rigid or flexible substrate, and may include at least one layer of insulating layer. In addition, the sensor substrate 121 may be a transparent or translucent light-transmitting substrate, but is not limited thereto. That is, in the disclosure, a material and a physical property of the sensor substrate 121 are not particularly limited. In addition, according to an embodiment, at least one substrate (for example, the display substrate 111, an encapsulation substrate, and/or a thin film encapsulation layer) constituting the display unit 110, at least one layer of insulating layer, functional layer, or the like disposed in an inside and/or on an outer surface of the display unit 110 may be used as the sensor substrate 121.

The touch sensing area SA is set as an area capable of responding to the touch input (that is, an active area of the touch sensor). To this end, the touch sensors SC for sensing the touch input or the like may be disposed in the touch sensing area SA. According to an embodiment, the touch sensors SC may include the first touch sensors TX and the second touch sensors RX.

For example, each of the first touch sensors TX may extend in a first direction DR1. The first touch sensors TX may be arranged in a second direction DR2. The second direction DR2 may be different from the first direction DR1. For example, the second direction DR2 may be a direction perpendicular to the first direction DR1. In another embodiment, an extension direction and an arrangement direction of the first touch sensors TX may follow another conventional configuration. Each of the first touch sensors TX may have a form in which first cells (or driving electrodes) of a relatively large area and first bridges of a relatively small area are connected. In FIG. 1, each of the first cells is shown in a diamond shape, but may be configured in various conventional shapes such as a circle, a quadrangle, a triangle, and a mesh shape. For example, the first bridges may be integrally formed on the same layer as the first cells. In another embodiment, the first bridges may be formed on a layer different from that of the first cells and may electrically connect adjacent first cells.

For example, each of the second touch sensors RX may extend in the second direction DR2. The second touch sensors RX may be arranged in the first direction DR1. In another embodiment, an extension direction and an arrangement direction of the second touch sensors RX may follow another conventional configuration. Each of the second touch sensors RX may have a form in which second cells (or touch sensing electrodes) of a relatively large area and second bridges of a relatively small area are connected. In FIG. 1, each of the second cells is shown in a diamond shape, but may be configured in various conventional shapes such as a circle, a quadrangle, a triangle, and a mesh shape. For example, the second bridges may be integrally formed on the same layer as the second cells. In another embodiment, the second bridges may be formed on a layer different from that of the second cells and may electrically connect adjacent second cells.

According to an embodiment, each of the first touch sensors TX and the second touch sensors RX may have conductivity by including at least one of a metal material, a transparent conductive material, and various other conductive materials. For example, the first touch sensors TX and the second touch sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. The first touch sensors TX and the second touch sensors RX may be configured in a mesh shape including conductive fine lines. In addition, the first touch sensors TX and the second touch sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, graphene, and the like. In addition, the first touch sensors TX and the second touch sensors RX may have conductivity by including at least one of various conductive materials. In addition, each of the first touch sensors TX and the second touch sensors RX may be formed as a single layer or multiple layers, and a cross-sectional structure thereof is not particularly limited.

Meanwhile, the gesture sensors JE for sensing the proximity, the motion, or the like of the object may be disposed in the peripheral area NSA of the sensor unit 120.

The gesture sensors JE may extend in the first direction DR1 or the second direction DR2 along a side of the display device 1. For example, the gesture sensors JE may be disposed adjacent to each other on an upper side, a lower side, a left side, and a right side of the touch sensing area SA. In this case, the gesture sensors JE may sense the object (or the motion of the object) moving in four directions up, down, left, and right on the display device 1 (and all directions according to a combination thereof).

The gesture sensors JE may have conductivity by including at least one of a metal material, a transparent conductive material, and various other conductive materials. According to an embodiment, the gesture sensors JE may have a mesh shape. In addition, the gesture sensors JE may be formed as a single layer or multiple layers, and a cross-sectional structure thereof is not particularly limited.

In addition, sensor lines for electrically connecting the first and second touch sensors TX and RX to the sensor driver 220 and the like may be intensively disposed in the peripheral area NSA of the sensor unit 120.

The driving circuit unit 20 may include the display driver 210 for driving the display unit 110 and the sensor driver 220 for driving the sensor unit 120. In an embodiment, each of the display driver 210 and the sensor driver 220 may be implemented as an integrated circuit (IC) (for example, a display integrated circuit (D-IC) and a sensor integrated circuit (T-IC)). In another embodiment, at least a portion of the display driver 210 and the sensor driver 220 may be embedded into one IC.

The display driver 210 may be electrically connected to the display 110 to drive the pixels PX. For example, the display driver 210 may provide a data signal to the pixels PX. In an embodiment, the display driver 210 may include a data driver and a timing controller, and the scan driver may be separately mounted in the non-display area NDA of the display 110. In another embodiment, the display driver 210 may include all or at least a portion of the data driver, the timing controller, and the scan driver.

The sensor driver 220 may be electrically connected to the sensor unit 120 to drive the sensor unit 120. The sensor driver 220 may include a sensor transmitter and a sensor receiver. The sensor transmitter may provide a driving signal to the first touch sensors TX, and the sensor receiver may receive a sensing signal from the second touch sensors RX and the gesture sensor JE. According to an embodiment, the sensor transmitter may also provide the driving signal to some of the gesture sensors JE. The sensor transmitter and the sensor receiver may be integrated into one IC, but are not limited thereto.

The processor 30 may be electrically connected to the display driver 210 and may provide grayscales and timing signals for the display frame period to the display driver 210. In addition, the processor 30 may be electrically connected to the sensor driver 220 and may receive the sensing signal from the sensor driver 220 or receive input information (for example, an input by the object and a position thereof). For example, the processor 30 may determine the input by the object (for example, a touch input, a coordinate thereof, the proximity, and the motion) based on the sensing signal. As another example, the sensor driver 220 may determine the input by the object based on the sensing signal, and the processor 30 may receive input information corresponding to a determination result from the sensor driver 220.

The processor 30 may correspond to at least one of a graphics processing unit (GPU), a central processing unit (CPU), an application processor (AP), and the like.

Figure 2:
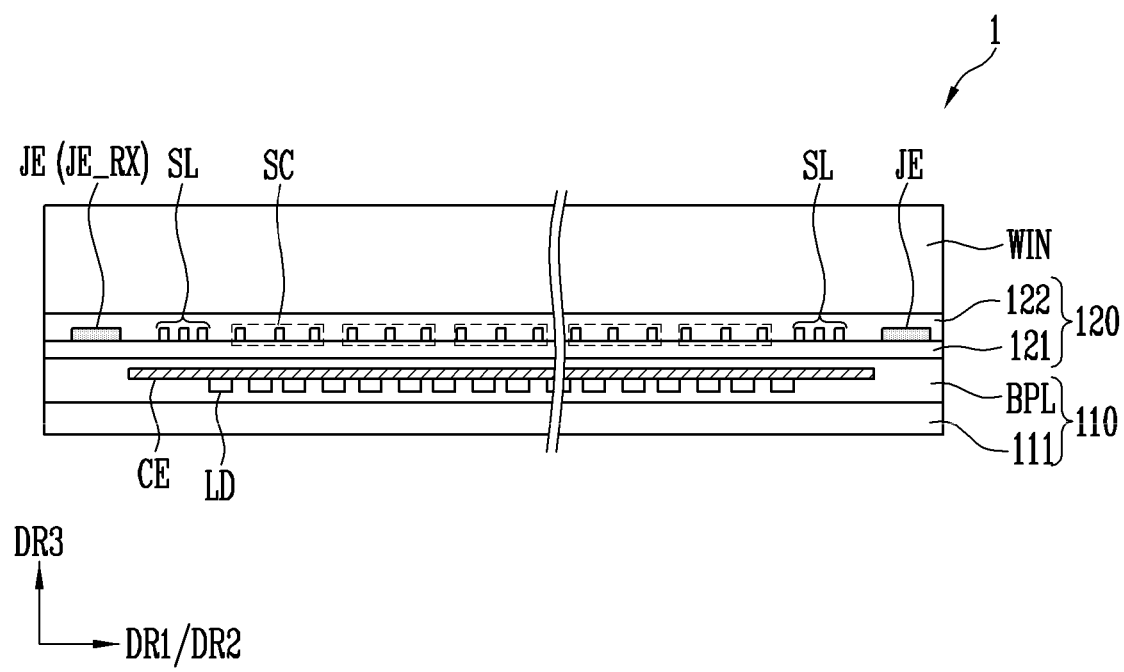
FIG. 2 is a cross-sectional view illustrating an embodiment of the display device of FIG. 1.

FIG. 2 is a cross-sectional view illustrating an embodiment of the display device of FIG. 1.

Referring to FIGS. 1 and 2, the sensor unit 120 may be stacked on the display unit 110. According to an embodiment, a window WIN may be stacked on the sensor unit 120.

The display unit 110 may include a display substrate 111 and a display layer BPL formed on the display substrate 111. The display layer BPL may include light emitting elements LD. The display layer BPL may include pixel circuits (for example, a transistor and a capacitor), scan lines GL (refer to FIG. 1), data lines DL (refer to FIG. 1), and the like for driving the light emitting elements LD of the pixels PX.

The sensor unit 120 may include the sensor substrate 121, and the touch sensors SC, the gesture sensors JE, and a protective layer 122 formed on the sensor substrate 121. The protective layer 122 may cover the touch sensors SC and the gesture sensors JE.

In the embodiment of FIG. 2, the sensor substrate 121 is shown as an encapsulation layer covering the pixels PX. In another embodiment, the sensor substrate 121 may exist separately from the encapsulation layer covering the pixels PX.

In an embodiment, the touch sensors SC may overlap a second electrode CE (or a cathode electrode, that is, a common electrode disposed on the light emitting elements LD and commonly connected to the light emitting elements LD) of the light emitting elements LD in a third direction DR3, and the gesture sensors JE may not overlap the second electrode CE in the third direction DR3. As will be described later with reference to FIGS. 5 and 6, the second electrode CE may overlap the touch sensors SC, and thus may prevent an influence from the light emitting elements LD disposed under the touch sensors SC (for example, a signal applied to the configuration under the light emitting elements LD operates as noise, and thus touch sensing sensitivity is reduced). That is, the second electrode CE may function as a shielding electrode. Meanwhile, since the second electrode CE does not overlap the gesture sensors JE, the second electrode CE may reduce a capacitance (or a base capacitance) of the gesture sensors JE, and may more accurately sense a change in a capacitance of the gesture sensors JE (for example, a small change in a capacitance due to the proximity of the object), and the proximity, the motion, and the like based thereon.

The window WIN may be a protective member disposed on the uppermost end of a module of the display device 1 and may be a substantially transparent light-transmitting substrate. The window WIN may have a multilayer structure selected from a glass substrate, a plastic film, and a plastic substrate. The window WIN may include a rigid or flexible substrate, and a configuration material of the window WIN is not particularly limited.

According to an embodiment, the display device 1 may further include a polarizing plate (or another type of anti-reflection layer) for preventing reflection of external light between the window WIN and the sensor unit 120.

Figure 3:
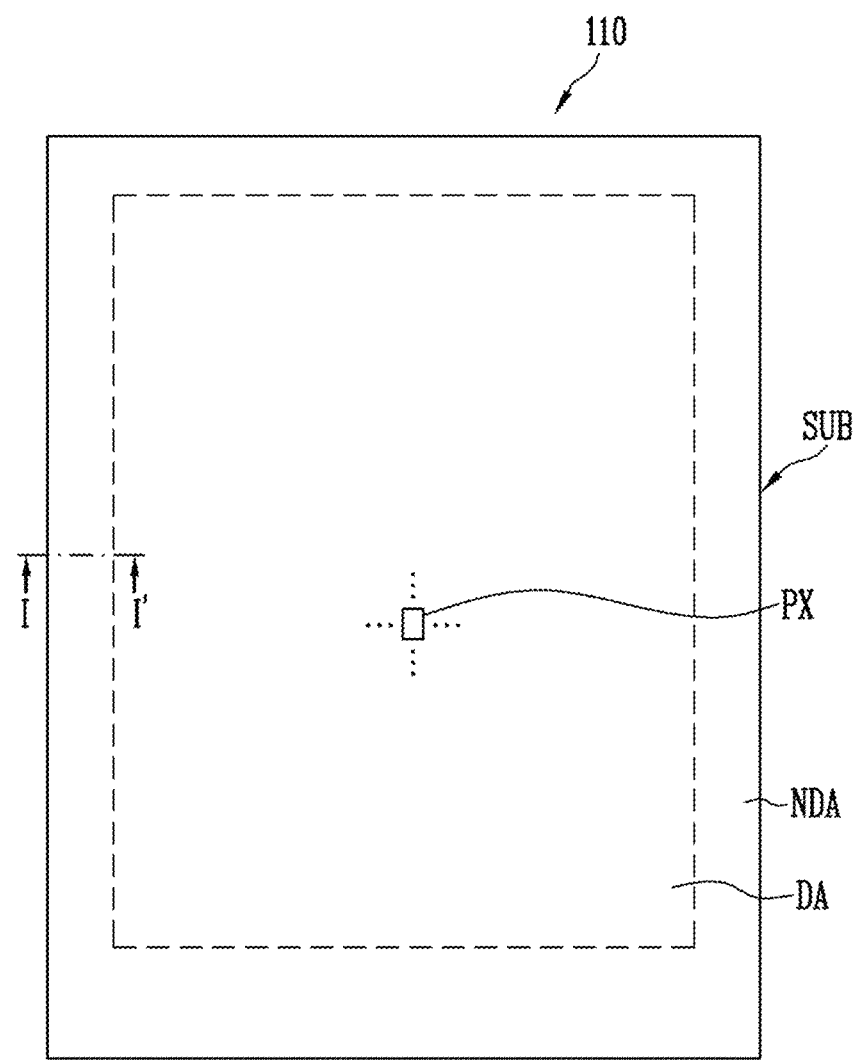
FIG. 3 is a plan view illustrating an embodiment of a display unit included in the display device of FIG. 1.
Figure 3:
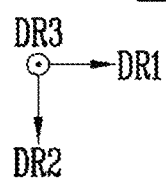

FIG. 3 is a plan view illustrating an embodiment of the display unit included in the display device of FIG. 1.

Referring to FIGS. 1 to 3, the display unit 110 may include the substrate SUB, pixels PX provided on the substrate SUB, a driver provided on the substrate SUB and driving the pixels PX, and a signal line unit (not shown) connecting the pixels PX and the driving unit (not shown). The substrate SUB may be the display substrate 111 of FIGS. 1 and 2 or may correspond thereto.

The substrate SUB may include one area having an approximately rectangular shape. However, the number of areas provided on the substrate SUB may be different from this, and the shape of the substrate SUB may have a different shape according to the area provided on the substrate SUB.

The substrate SUB may be formed of an insulating material such as glass or resin. In addition, the substrate SUB may be formed of a material having flexibility to be bent or folded, and may have a single-layer structure or a multilayer structure. For example, the material having flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. In an embodiment of the disclosure, the substrate SUB may be formed of polyimide having flexibility. However, the material constituting the substrate SUB is not limited to the above-described embodiments.

The substrate SUB may include a display area DA and a non-display area NDA. The display area DA may be an area in which the pixels PX are provided to display an image, and the non-display area NDA may be an area in which the pixels PX are not provided and may be an area in which an image is not displayed. For convenience of description, only one pixel PX is shown in FIG. 3, but a plurality of pixels PX may be disposed in the display area DA of the substrate SUB.

The pixels PX may be provided in the display area DA of the substrate SUB. Each of the pixels PX may be a minimum unit for displaying an image. The pixels PX may include a light emitting element emitting white light and/or color light. Each of the pixels PX may emit any one color among red, green, and blue, but is not limited thereto, and may emit cyan, magenta, yellow, or the like.

The pixels PX may be arranged in a matrix form along a row extending in the first direction DR1 and a column extending in the second direction DR2 crossing the first direction DR1. However, an arrangement form of the pixels PX is not particularly limited, and the pixels PX may be arranged in various forms. The pixels PX have a rectangular shape in the drawing, but the disclosure is not limited thereto, and the pixels PX may be modified into various shapes. In addition, when a plurality of pixels PX are provided, the plurality of pixels PX may be provided to have different areas (or sizes). For example, in a case of pixels PX having different colors of emitted light, the pixels PX may be provided in different areas (or sizes) or in different shapes for each color.

Figure 4:
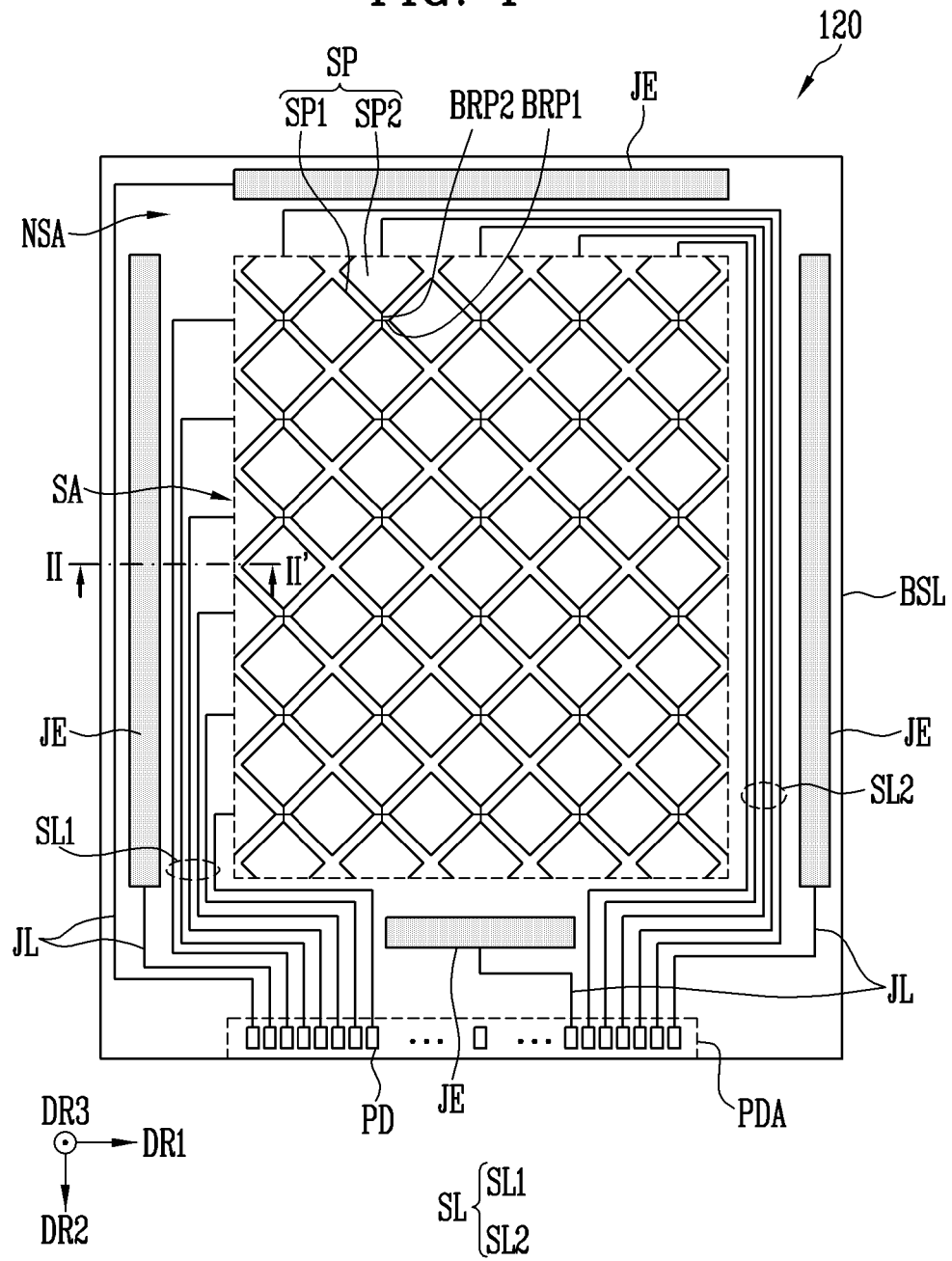
FIG. 4 is a plan view illustrating an embodiment of a sensor unit included in the display device of FIG. 1.

FIG. 4 is a plan view illustrating an embodiment of the sensor unit included in the display device of FIG. 1.

Referring to FIGS. 1 to 4, the sensor unit 120 may include a base layer BSL. The base layer BSL may be the sensor substrate 121 of FIGS. 1 and 2 or may correspond thereto. The base layer BSL may include a touch sensing area SA and a peripheral area NSA.

A touch sensor electrode for sensing a touch input may be provided and/or formed in the touch sensing area SA.

Sensing lines SL (or touch sensing lines) electrically connected to the touch sensor electrodes to receive and transfer a touch sensing signal may be provided and/or formed in the peripheral area NSA. In addition, in the peripheral area NSA, the gesture sensors JE (or gesture sensor electrodes) for sensing the proximity, the motion, and the like of the object, and gesture sensing lines JL electrically connected to the gesture sensors JE to receive and transfer a proximity sensing signal may be provided and/or formed. A pad unit PDA electrically connected to the sensing lines SL and the gesture sensing lines JL may be disposed in the peripheral area NSA. The pad unit PDA may include a plurality of pads PD.

The touch sensor electrode may include a plurality of sensor patterns SP (or cells) and first and second bridges BRP1 and BRP2.

The sensor patterns SP may include a plurality of first sensor patterns SP1 and a plurality of second sensor patterns SP2 electrically insulated from the first sensor patterns SP1.

The first sensor patterns SP1 may be arranged in the first direction DR1 and may be electrically connected to adjacent first sensor patterns SP1 by the first bridges BRP1 to configure at least one sensor row. The second sensor patterns SP2 may be arranged in the second direction DR2 crossing the first direction DR1 and may be electrically connected to adjacent second sensor patterns SP2 through the second bridges BRP2 to configure at least one sensor column.

Each of the first and second sensor patterns SP1 and SP2 may be electrically connected to one pad PD through a corresponding sensing line SL. For example, each of the first sensor patterns SP1 may be electrically connected to one pad PD through each first sensing line SL1, and each of the second sensor patterns SP2 may be electrically connected to one pad PD through each second sensing line SL2.

The above-described first sensor patterns SP1 may be touch driving electrodes that receive a driving signal for detecting a touch position in the touch sensing area SA, and the second sensor patterns SP2 may be touch sensing electrodes that receive a sensing signal for detecting the touch position in the touch sensing area SA. However, the disclosure is not limited thereto, and the first sensor patterns SP1 may be touch sensing electrodes, and the second sensor patterns SP2 may be touch driving electrodes.

The sensor driver 220 (refer to FIG. 1) may recognize the touch of the object by sensing a change amount of a mutual capacitance formed between the first and second sensor patterns SP1 and SP2.

The gesture sensors JE may extend in the first direction DR1 or the second direction DR2 along an edge of the sensor unit 120. The gesture sensors JE may not overlap the sensing lines SL, but are not limited thereto. The gesture sensors JE may be disposed adjacent to upper, lower, left, and right sides of the touch sensing area SA, respectively. Each of the gesture sensors JE may be electrically connected to one pad PD through a corresponding gesture sensing line JL.

In an embodiment, the gesture sensors JE may be gesture sensing electrodes that output a sensing signal for detecting the proximity, the motion, and the like of the object. In this case, at least some of the touch sensor electrodes (for example, sensor patterns SP) may be used as gesture driving electrodes that receive the driving signal for detecting the proximity, the motion, and the like of the object, and the sensor driver 220 (refer to FIG. 1) may recognize the proximity, the motion, or the like of the object by sensing a change amount of a capacitance formed between the gesture sensors JE and the touch sensor electrode (for example, the sensor patterns SP).

In another embodiment, the gesture sensors JE may include a gesture driving electrode receiving the driving signal for detecting the proximity, the motion, and the like of the object, and a gesture sensing electrode outputting a sensing signal corresponding to the driving signal. In this case, the sensor driver 220 (refer to FIG. 1) may recognize the proximity, the motion, or the like of the object by sensing a change amount of a capacitance of the gesture sensors JE itself (or between the gesture driving electrode and the gesture sensing electrode in the gesture sensors JE).

Figure 5:
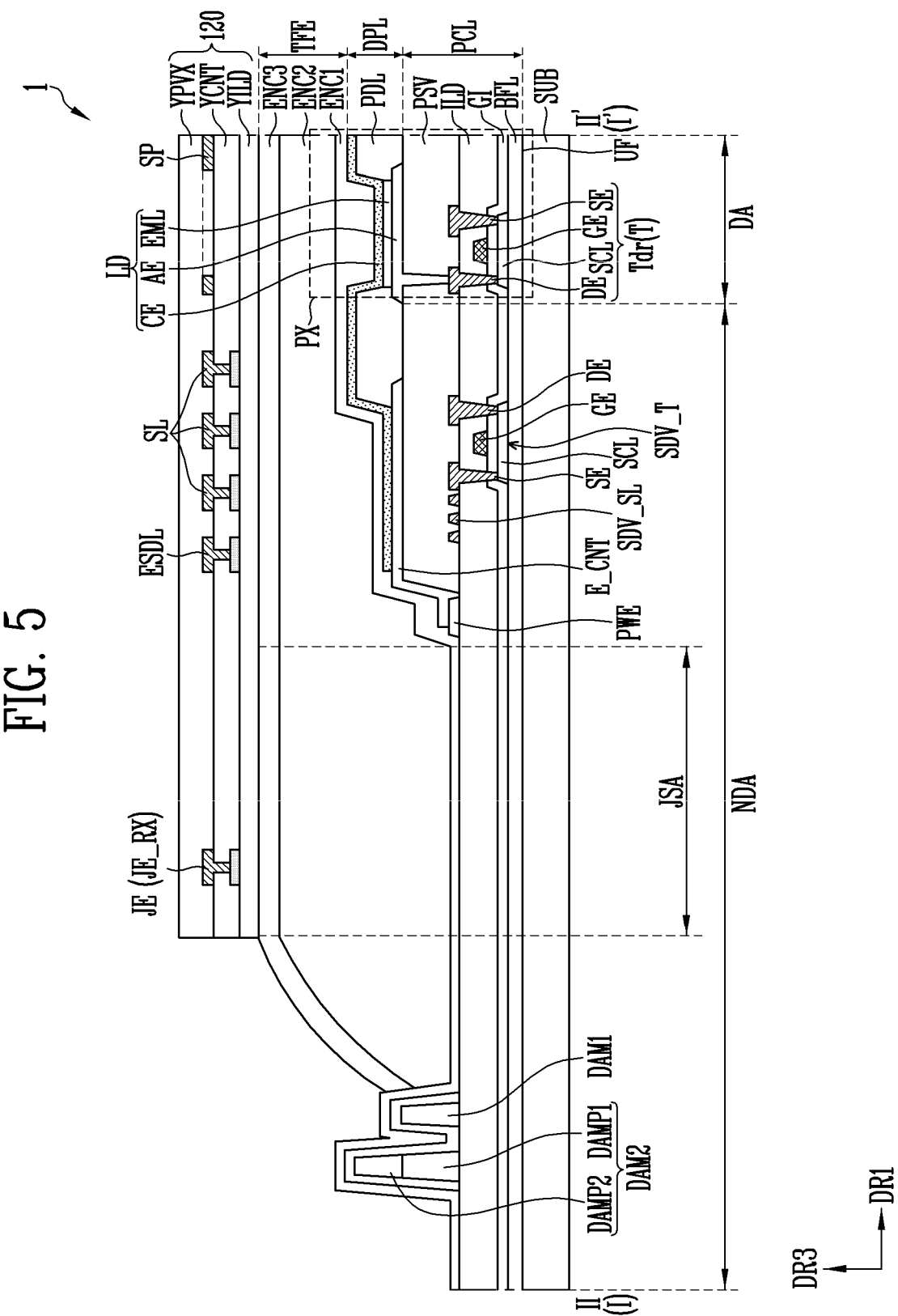
FIG. 5 is a cross-sectional view illustrating an embodiment of the display device taken along a line II-II' of FIG. 4 and a line I-I' of FIG. 3.

FIG. 5 is a cross-sectional view illustrating an embodiment of the display device taken along a line II-II' of FIG. 4 and a line I-I' of FIG. 3.

In FIG. 5, a structures of the display device 1 (or the pixel PX) are simplified, such as showing each electrode as a single electrode layer and each insulating layer as only a single insulating layer, but the disclosure is not limited thereto.

In an embodiment of the disclosure, "formed and/or provided on the same layer" may mean formed in the same process (and using the same material), and "formed and/or provided on different layers" may mean formed in different processes (and using different materials).

Referring to FIGS. 1 to 5, the display device 1 may include the pixel PX and the sensor patterns SP provided in the display area DA, the sensing line SL, the gesture sensor JE (or the gesture sensor electrode), and dams DAM1 and DAM2 provided in the non-display area NDA. Hereinafter, a stack structure of the display device 1 in the display area DA is described first, and then a stack structure of the display device 1 in the non-display area NDA is described.

The display device 1 may include a pixel circuit layer PCL, a display element layer DPL, a thin film encapsulation layer TFE, and the sensor unit 120 sequentially stacked on the substrate SUB. In the display area DA, the pixel circuit layer PCL may include a buffer layer BFL, a driving transistor Tdr, and a protective layer PSV. The driving transistor Tdr is a transistor that controls a driving current provided to a light emitting element LD, and since structures of transistors T included in the pixel PX are substantially equal or similar to each other, only the driving transistor Tdr is shown as an example.

The buffer layer BFL may be provided and/or formed on one surface UF (or an upper surface) of the substrate SUB. The buffer layer BFL may prevent an impurity from diffusing into the driving transistor Tdr. The buffer layer BFL may be an insulating layer and may include an inorganic material. For example, the inorganic material may include a metal nitride such as silicon nitride ($SiN_x$) or a metal oxide such as silicon oxide ($SiO_x$), silicon oxynitride (SiON), and aluminum oxide ($AlO_x$). The buffer layer BFL may be provided as a single layer, or may be provided as multiple layers of at least double layers. When the buffer layer BFL is provided as the multiple layers, each layer may be formed of the same material or may be formed of different materials. The buffer layer BFL may be omitted according to a material, a process condition, and the like of the substrate SUB.

The driving transistor Tdr may be provided on the buffer layer BFL (or the substrate SUB). The driving transistor Tdr may include a semiconductor pattern SCL, a gate electrode GE, a first terminal SE, and a second terminal DE. The first terminal SE may be any one of a source electrode and a drain electrode, and the second terminal DE may be the other electrode. For example, when the first terminal SE is a source electrode, the second terminal DE may be a drain electrode.

The semiconductor pattern SCL may be provided and/or formed on the buffer layer BFL. The semiconductor pattern SCL may include a first contact area contacting the first terminal SE and a second contact area contacting the second terminal DE. An area positioned between the first contact area and the second contact area and overlapping the gate electrode GE may be a channel area of the driving transistor Tdr. The semiconductor pattern SCL may be a semiconductor pattern formed of polysilicon, amorphous silicon, oxide semiconductor, or the like. The channel area may be a semiconductor pattern that is not doped with an impurity, and may be an intrinsic semiconductor. The first contact area and the second contact area may be semiconductor patterns heavily doped with an impurity.

A gate insulating layer GI may be provided and/or formed on the semiconductor pattern SCL. The gate insulating layer GI may be an insulating layer and may include an inorganic material. However, the disclosure is not limited thereto, and according to an embodiment, the gate insulating layer GI may include an organic material. The gate insulating layer GI may be provided as a single layer, but may also be provided as multiple layers of at least double layers.

The gate electrode GE may be provided and/or formed on the semiconductor pattern SCL with the gate insulating layer GI interposed therebetween. For example, the gate electrode GE may be provided and/or formed on the gate insulating layer GI. The gate electrode GE may include a conductive material. For example, the conductive material may include a metal such as gold (Au), silver (Ag), aluminum (Al), molybdenum (Mo), chromium (Cr), titanium (Ti), nickel (Ni), neodymium (Nd), and copper (Cu). In addition, the gate electrode GE may be formed as a single layer, but is not limited thereto, and may be formed as multiple layers in which at least two or more materials are stacked.

An interlayer insulating layer ILD may be provided and/or formed on the gate electrode GE. The interlayer insulating layer ILD may be an insulating layer and may include an inorganic material. The interlayer insulating layer ILD may be formed as a single layer or multiple layers. According to an embodiment, the interlayer insulating layer ILD may include an organic material.

The respective first terminal SE and second terminal DE may be in contact with the first contact area and the second contact area of the semiconductor pattern SCL through a contact hole formed through an interlayer insulating layer ILD and the gate insulating layer GI. For example, the first terminal SE may be in contact with one contact area of the first and second contact areas of the semiconductor pattern SCL, and the second terminal DE may be in contact with a remaining contact area of the first and second contact areas of the semiconductor pattern SCL. The first and second terminals SE and DE may include a conductive material. The first and second terminals SE and DE may be formed as a single layer or multiple layers.

In the above-described embodiment, the first and second terminals SE and DE of the driving transistor Tdr are separate electrodes electrically connected to different portions of the semiconductor pattern SCL through a contact hole formed through the gate insulating layer GI and the interlayer insulating layer ILD, but the disclosure is not limited thereto. According to an embodiment, the first terminal SE of the driving transistor Tdr may be one of the first and second contact areas adjacent to the channel area of the semiconductor pattern SCL, and the second terminal DE of the driving transistor Tdr may be the other of the first and second contact areas adjacent to the channel area of the semiconductor pattern SCL. In this case, the second terminal DE of the driving transistor Tdr may be electrically connected to the light emitting element LD of each pixel PX through a separate connection means including a bridge electrode or a contact electrode.

According to an embodiment, a sub-interlayer insulating layer may be provided and/or formed on the first and second terminals SE and DE of the driving transistor Tdr. In this case, a first additional electrode (or a first connection electrode) corresponding to the first terminal SE and a second additional electrode (or a first connection electrode) corresponding to the second terminal DE may be provided and/or formed on the sub-interlayer insulating layer. The first additional electrode (or the first connection electrode) may be electrically connected to the first terminal SE disposed thereunder through a contact hole formed through the sub-interlayer insulating layer, and the second additional electrode (or the second connection electrode) may be electrically connected to the second terminal DE disposed thereunder through a contact hole formed through the sub-interlayer insulating layer.

In FIG. 5, the driving transistor Tdr is shown as a top gate structure of thin film transistor, but is not limited thereto. For example, the driving transistor Tdr may be a bottom gate structure of thin film transistor.

The protective layer PSV may be provided and/or formed on the driving transistor Tdr.

The protective layer PSV may be an insulating layer and may be an organic layer, an inorganic layer, or an organic layer disposed on an inorganic layer. The inorganic layer may include an inorganic material. The organic layer may include an organic material. For example, the organic material may include an acrylic resin (polyacrylates resin), an epoxy resin, a phenolic resin, a polyamide resin, a polyimides resin, an unsaturated polyesters resin, a poly-phenylene ethers resin, a poly-phenylene sulfides resin, and a benzocyclobutene resin.

The display element layer DPL may be provided and/or formed on the protective layer PSV.

The display element layer DPL may be provided on the protective layer PSV and may include the light emitting element LD that emits light. The light emitting element LD may include first and second electrodes AE and CE and an emission layer EML provided between the two electrodes AE and CE. One of the first and second electrodes AE and CE may be an anode electrode, and a remaining electrode may be a cathode electrode. For example, the first electrode AE may be the anode electrode, and the second electrode CE may be the cathode electrode. When the light emitting element LD is a front surface emission type organic light emitting diode, the first electrode AE may be a reflective electrode, and the second electrode CE may be a transmissive electrode.

The first electrode AE may be electrically connected to the second terminal DE of the driving transistor Tdr through a contact hole formed through the protective layer PSV. The first electrode AE may include a reflective layer capable of reflecting light or a transparent conductive layer disposed on or under the reflective layer. For example, the transparent conductive layer may include a transparent conductive material, and the transparent conductive material may include a transparent conductive material such as ITO, IZO, IGZO, and ITZO, and a conductive polymer such as PEDOT. The reflective layer may include a metal material such as silver (Ag).

The display element layer DPL may further include a pixel defining layer PDL having an opening exposing a portion of the first electrode AE, for example, an upper surface of the first electrode AE. The pixel defining layer PDL may be an insulating layer and may include an organic material.

The emission layer EML may be disposed in an area corresponding to the opening of the pixel defining layer PDL. That is, the emission layer EML may be disposed on one surface of the exposed first electrode AE. The emission layer EML may have a multilayer thin film structure including at least one light generation layer. The emission layer EML may include a hole injection layer that injects a hole, a hole transport layer having an excellent hole transport property, and an electron blocking layer for suppressing a movement of electrons that are not combined in the light generation layer for increasing a chance of recombination of holes and electrons by suppressing a movement of an electron that is not combined in the light generation layer, the light generation layer that emits light by the recombination of the injected electron and hole, a hole blocking layer for suppressing a movement of holes that are not combined in the light generation layer, an electron transport layer for smoothly transporting the electron to the light generation layer, and an electron injection layer for injecting the electron.

A color of the light generated in the light generating layer may be one of red, green, blue, and white, but is not limited thereto. For example, the color of the light generated in the light generating layer of the emission layer EML may be one of magenta, cyan, and yellow. The hole injection layer, the hole transport layer, the hole blocking layer, the electron transport layer, and the electron injection layer may be a common layer connected in emission areas adjacent to each other.

The second electrode CE may be provided and/or formed on the emission layer EML. The second electrode CE may be a common layer commonly provided to the pixel PX and another pixel. The second electrode CE may be a transmissive electrode and may include a transparent conductive material.

The thin film encapsulation layer TFE may be provided and/or formed on the second electrode CE.

The thin film encapsulation layer TFE may be formed of a single layer, but may also be formed of multiple layers. The thin film encapsulation layer TFE may include a plurality of insulating layers covering the light emitting element LD. Specifically, the thin film encapsulation layer TFE may include at least one inorganic layer and at least one organic layer. For example, the thin film encapsulation layer TFE may have a structure in which an inorganic layer and an organic layer are alternately stacked. According to an embodiment, the thin film encapsulation layer TFE may be an encapsulation substrate disposed on the light emitting element LD and bonded to the substrate SUB through a sealant.

The thin film encapsulation layer TFE may include first, second, and third encapsulation layers ENC1, ENC2, and ENC3. The first encapsulation layer ENC1 may be provided and/or formed on the display element layer DPL and may be positioned over at least a portion of the display area DA and the non-display area NDA. The second encapsulation layer ENC2 may be provided and/or formed on the first encapsulation layer ENC1 and may be positioned over at least a portion of the display area DA and the non-display area NDA. The third encapsulation layer ENC3 may be provided and/or formed on the second encapsulation layer ENC2 and may be positioned over at least a portion of the display area DA and the non-display area NDA. According to an embodiment, the third encapsulation layer ENC3 may be positioned over the entire display area DA and non-display area NDA. The first and third encapsulation layers ENC1 and ENC3 may be formed of an inorganic layer including an inorganic material, and the second encapsulation layer ENC2 may be formed of an organic layer including an organic material.

In FIG. 5, the display element layer DPL includes the light emitting element LD which includes the organic light emitting diode having the first electrode AE, the emission layer EML, and the second electrode CE, but is not limited thereto. According to an embodiment, the display element layer DPL may include ultra-small inorganic light emitting element LD as small as a micro-scale or a nano-scale formed in a structure in which a nitride-based semiconductor is grown.

The sensor unit 120 may be disposed on the thin film encapsulation layer TFE. The sensor unit 120 may be directly disposed or formed on the thin film encapsulation layer TFE using the thin film encapsulation layer TFE as a base layer. In other words, the sensor unit 120 may be directly formed on the thin film encapsulation layer TFE through a process subsequent to a process of forming the thin film encapsulation layer TFE.

The sensor unit 120 may include insulating layers sequentially stacked on the thin film encapsulation layer TFE, that is, a base layer YILD, a first sensor insulating layer YCNT, and a second sensor insulating layer YPVX. In addition, the sensor unit 120 may include a sensor pattern SP (or the touch sensor electrode), the sensing line SL, an electrostatic discharge line ESDL, and the gesture sensor JE (or the gesture sensor electrode) disposed between the insulating layers (that is, between the base layer YILD, the first sensor insulating layer YCNT, and the second sensor insulating layer YPVX). The sensor pattern SP may be provided in the display area DA, and the sensing line SL, the electrostatic discharge line ESDL, and the gesture sensor JE may be provided in the non-display area NDA. The sensor pattern SP in the display area DA is described first, and the sensing line SL, the electrostatic discharge line ESDL, and the gesture sensor JE are described later together with other configurations of the non-display area NDA.

The base layer YILD is a buffer layer and may include an inorganic material, but is not limited thereto. According to an embodiment, the base layer YILD may be omitted.

The first sensor insulating layer YCNT may be disposed on the base layer YILD. The base layer YILD may be an insulating layer and may include an inorganic material, but is not limited thereto.

The sensor pattern SP may be disposed on the first sensor insulating layer YCNT. The sensor pattern SP may be disposed on the light emitting element LD (or the pixel PX), and may not overlap the light emitting element LD in the third direction DR3. For example, the sensor pattern SP may have a mesh structure including a plurality of conductive fine lines and may include openings corresponding to the light emitting elements LD.

In the non-display area NDA, the driver and the signal line unit included in the pixel circuit layer PCL may be positioned. The driver may include at least one driver transistor SDV_T formed through the same process as the driving transistor Tdr of the pixel PX. The driver transistor SDV_T may include a semiconductor pattern SCL, a gate electrode GE, a first terminal SE, and a second terminal DE. The signal line unit may include signal lines SDV_SL connecting the driver and the pixel PX. Here, the signal lines SDV_SL may be fan-out lines.

Figure 7:
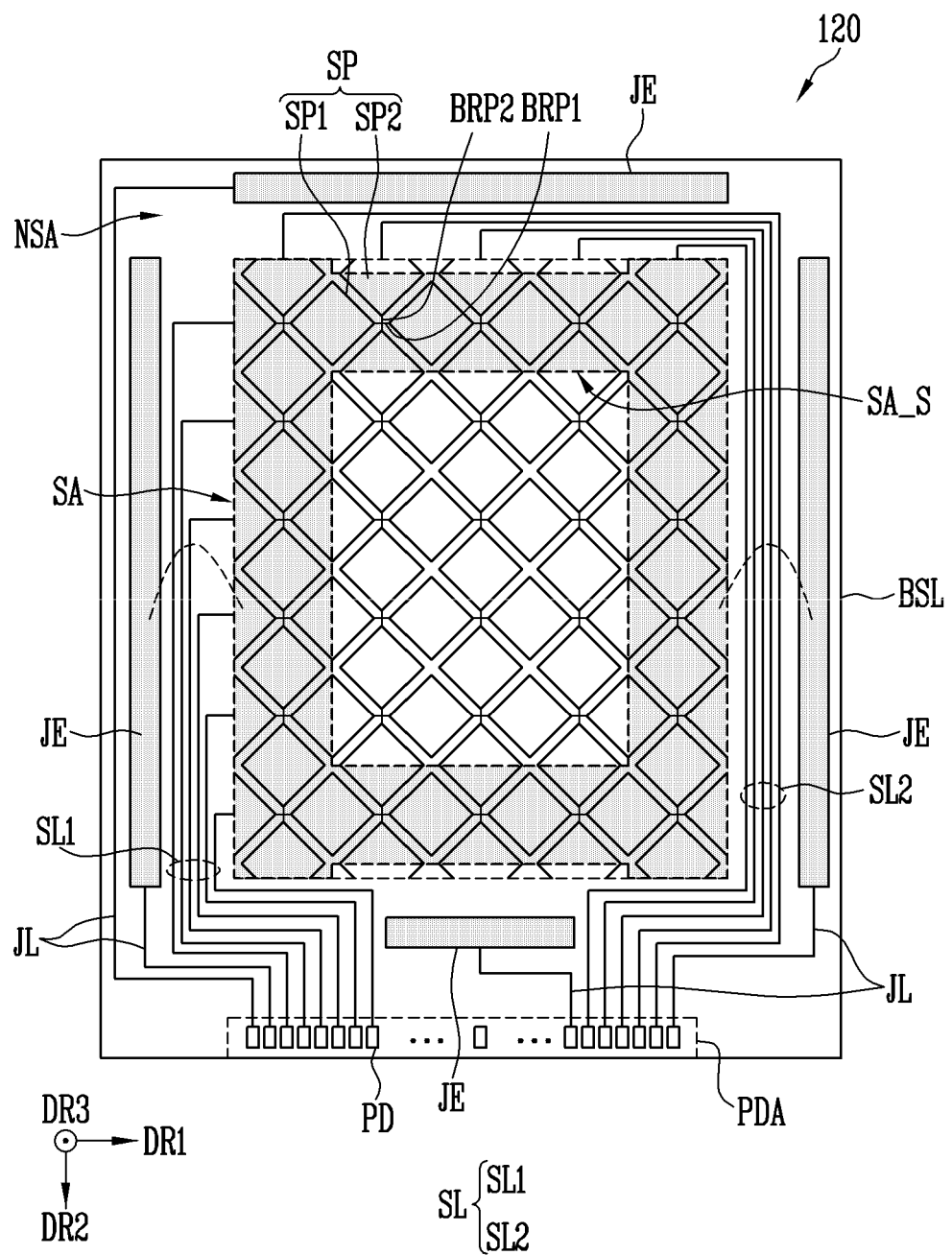
FIG. 7 is a diagram illustrating an embodiment of an operation of the sensor unit included in the display device of FIG. 1.

In addition, a power electrode PWE receiving driving power (for example, a constant voltage) from an outside, and a connection electrode E_CNT connected to the power electrode PWE may be disposed in the non-display area NDA. The power electrode PWE may be disposed outside the signal lines SDV_SL (that is, outside the display device 1). As shown in FIG. 5, the connection electrode E_CNT may electrically connect the power electrode PWE and the second electrode CE of the light emitting element LD. As shown in FIG. 7, the connection electrode E_CNT may be formed through the same process as the first electrode AE constituting the light emitting element LD, and may include the same material as the first electrode AE. However, the disclosure is not limited thereto, and according to an embodiment, the connection electrode E_CNT may be provided on the same layer as one conductive layer among conductive layers in the pixel circuit layer PCL within a range in which the connection electrode E_CNT electrically connects the power electrode PWE and the second electrode CE.

The dams DAM1 and DAM2 may be provided at an edge of the display device 1. For example, in a plan view, the dams DAM1 and DAM2 may be disposed along the edge of the display device 1 outside of the gesture sensor JE. A second dam DAM2 may be disposed outside a first dam DAM1. The first dam DAM1 may be formed simultaneously with the protective layer PSV included in the pixel circuit layer PCL.

The second dam DAM2 may include a lower portion DAMP1 formed simultaneously with the protective layer PSV included in the pixel circuit layer PCL, and an upper portion DAMP2 formed simultaneously with the pixel defining layer PDL included in the display element layer DPL. According to an embodiment, the dams DAM1 and DAM2 may be formed simultaneously with at least one insulating layer among insulating layers included in the pixel circuit layer PCL. The dams DAM1 and DAM2 may prevent a liquid organic material from overflowing to an outer area of the substrate SUB in a process of forming an organic layer included in the thin film encapsulation layer TFE, for example, the second encapsulation layer ENC2.

The sensing line SL, the electrostatic discharge line ESDL, and the gesture sensor JE may be disposed on the same layer in the non-display area NDA. In the non-display area NDA, the sensing line SL, the electrostatic discharge line ESDL, and the gesture sensor JE may be disposed on the base layer YILD (or the thin film encapsulation layer TFE). The sensing line SL may be disposed outside the sensor pattern SP (that is, outside the display device 1), the electrostatic discharge line ESDL may be disposed outside the sensing line SL, and the gesture sensor JE may be disposed outside the electrostatic discharge line ESDL (or the sensing line SL). The electrostatic discharge line ESDL may be a line for discharging static electricity flowing into the sensor unit 120. For example, the electrostatic discharge line ESDL may be electrically connected to a power line such as ground, but is not limited thereto.

Each of the sensing line SL, the electrostatic discharge line ESDL, and the gesture sensor JE may be formed as multiple layers.

For example, each of the sensing line SL, the electrostatic discharge line ESDL, and the gesture sensor JE may include a first conductive pattern disposed on the base layer YILD and a second conductive pattern disposed on the first sensor insulating layer YCNT. The second conductive pattern may overlap the first conductive pattern in the third direction DR3, and the second conductive pattern may be electrically connected to the second conductive pattern through a contact hole formed through the first sensor insulating layer YCNT.

Each of the first and second conductive patterns may include at least one of a metal material, a transparent conductive material, and various other conductive materials. For example, the first and second conductive patterns may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or an alloy thereof. The first and second conductive patterns may have a mesh shape including conductive fine lines. In addition, the first and second conductive patterns may include at least one of various transparent conductive materials including a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube (Carbon Nano Tube), grapheme, and the like. In addition, the first and second conductive patterns may have conductivity by including at least one of various conductive materials.

In an embodiment, the gesture sensor JE may be a gesture sensing electrode JE_RX that outputs the sensing signal for detecting the proximity, the motion, and the like of the object. For example, the driving signal (that is, the driving signal for detecting the proximity, the motion, and the like of the object) may be applied to at least a portion of the sensor pattern SP, and the sensor driver 220 (refer to FIG. 1) may recognize the proximity, the motion, and the like of the object by sensing a change amount (or a change of an electric field) of a capacitance between the gesture sensor JE and the at least the portion of the sensor pattern SP.

In an embodiment, the gesture sensor JE may be position in a gesture sensor area JSA in the non-display area NDA. In a plan view, the gesture sensor area JSA may be position between the dams DAM1 and DAM2 and the power electrode PWE. In this case, the gesture sensor JE may not overlap the power electrode PWE and signal lines electrically connected to the power electrode PWE (that is, the connection electrode E_CNT and the second electrode CE) in the third direction DR3. In addition, the gesture sensor JE may also not overlap the driver transistor SDV_T and the signal lines SDV_SL in the third direction DR3. Meanwhile, the sensing line SL (and all of the sensor patterns SP) may overlap the power electrode PWE, the connection electrode E_CNT, and the second electrode CE in the third direction DR3.

The second electrode CE may cover or shield a driving circuit, such as the signal lines SDV_SL and the driver transistor SDV_T of the driver, and the driving transistor Tdr of the pixel PX, to prevent signals applied to the driving circuit from affecting the sensor pattern SP and the sensing line SL as noise. In this case, touch sensing sensitivity of the sensor unit 120 may be improved.

When the second electrode CE does not overlap the gesture sensor JE in the third direction DR3, a capacitance (or a base capacitance) of the gesture sensor JE may be reduced. In this case, the sensor driver 220 (refer to FIG. 1) may more accurately sense a change in a capacitance of the gesture sensor JE (for example, a small change in a capacitance by the proximity of the object), and the proximity, the motion, and the like based thereon.

Figure 6:
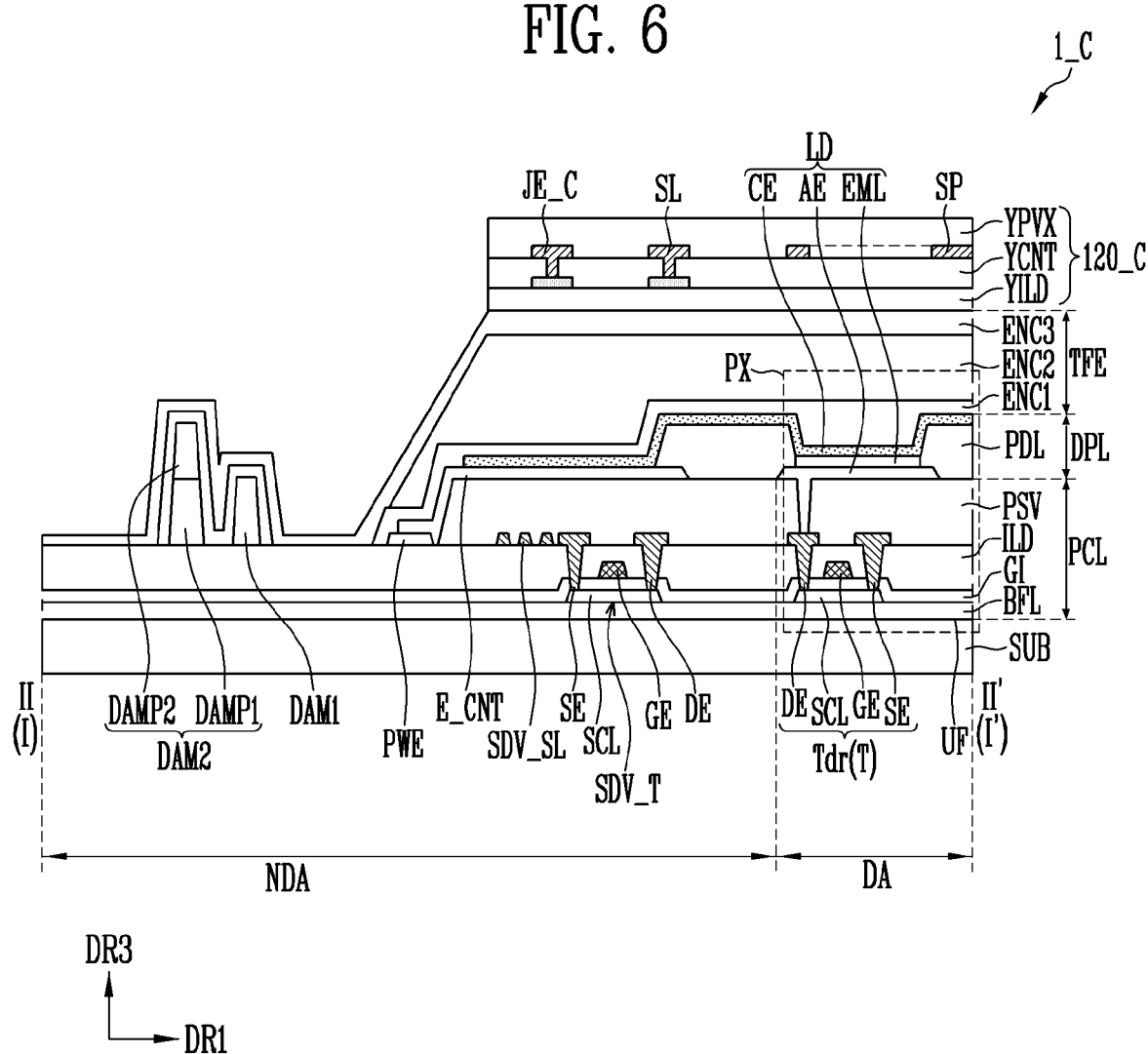
FIG. 6 is a cross-sectional view illustrating a comparative example of the display device taken along the line II-II' of FIG. 4 and the line I-I' of FIG. 3.

FIG. 6 is a cross-sectional view illustrating a comparative example of the display device taken along the line II-II' of FIG. 4 and the line I-I' of FIG. 3.

Referring to FIGS. 5 and 6, the display device 1_C of FIG. 6 is substantially equal or similar to the display device 1 of FIG. 5, except for a disposition position of a gesture sensor JE_C, and thus an overlapping description is not repeated.

The gesture sensor JE_C may overlap the second electrode CE in the third direction DR3. In this case, the second electrode CE may prevent the signals applied to the driving circuit, such as the driver transistor SDV_T, from affecting the sensor pattern SP and the sensing line SL as noise. However, a capacitance (or a base capacitance) of the gesture sensor JE_C may increase.

Meanwhile, the gesture sensor JE_C may be a sensor for sensing the proximity (and the motion) of the object that is not in contact with the display device 1, and the change in the capacitance by the proximity (and the motion) of the object may be very small (for example, 1/20 times level) compared to the change in the capacitance of the sensor pattern SP by the touch of the object. The gesture sensor JE_C having a relatively large capacitance (or base capacitance) may not properly sense a relatively small change in capacitance. That is, proximity sensing sensitivity of the sensor unit 120_C may be reduced.

The gesture sensor JE of the sensor unit 120 of FIG. 5 may not overlap the second electrode CE, the connection electrode E_CNT, and the power electrode PWE in the third direction DR3, and may have a relatively small capacitance (or base capacitance). Accordingly, proximity sensing sensitivity of the sensor unit 120 of FIG. 5 may be improved. In particular, the sensor unit 120 of FIG. 5 may more accurately sense the proximity and the motion of the object, and may sense the proximity and the motion of the object positioned farther away from the display device 1 as compared to the sensor unit 120_C of FIG. 6.

FIG. 7 is a diagram illustrating an embodiment of an operation of the sensor unit included in the display device of FIG. 1.

Referring to FIGS. 1, 4 and 7, since the sensor unit 120 of FIG. 7 is substantially equal to the sensor unit 120 of FIG. 4, an overlapping description is not repeated.

In an embodiment, the sensor driver 220 (refer to FIG. 1) may use at least a portion of the sensor pattern SP as the gesture driving electrode for detecting the proximity, the motion, and the like of the object. For example, the sensor driver 220 (refer to FIG. 1) may apply the driving signal for detecting the proximity, the motion, and the like of the object to at least a portion of the sensor pattern SP.

Referring to FIG. 7, for example, the driving signal may be applied to the sensor patterns SP the most adjacent to the gesture sensors JE, that is, the sensor patterns SP positioned in a sub area SA_S adjacent to an edge of the touch sensing area SA. In this case, an electric field may be formed between the sensor patterns SP of the sub area SA_S and the gesture sensors JE, and the sensor driver 220 (refer to FIG. 1) may sense a change in the electric field generated when the object approaches (that is, a change in the capacitance between the sensor patterns SP and the gesture sensors JE of the sub-area SA_S), and may sense the proximity of the object and/or the motion of the object.

As another example, the driving signal may be applied to sensor patterns SP except for the sensor patterns SP the most adjacent to the gesture sensors JE, for example, sensor patterns SP corresponding to a remaining area except for the touch sensing area SA. As still another example, the driving signal may be applied to all of the sensor patterns SP in the touch sensing area SA.

The sensor patterns SP used as the gesture driving electrode (that is, to which the driving signal for detecting the proximity, the motion, and the like is applied) may be variously changed in consideration of a proximity sensing possible distance (a load, and the like) according to the electric field formed between the sensor patterns SP and the gesture sensors JE.

Meanwhile, a proximity sensing frame period for detecting the proximity, the motion, and the like of the object may be set independently of a touch sensing frame period for detecting the touch input, a touch driving signal for detecting the touch input is applied to at least a portion of the sensing pattern SP in the touch sensing frame period, and a gesture driving signal for sensing the proximity, the motion, and the like may be applied to at least a portion of the sensing pattern SP in the proximity sensing frame period. For example, a waveform (for example, an amplitude and a frequency) of the gesture driving signal may be different from that of the touch driving signal.

Figure 8:
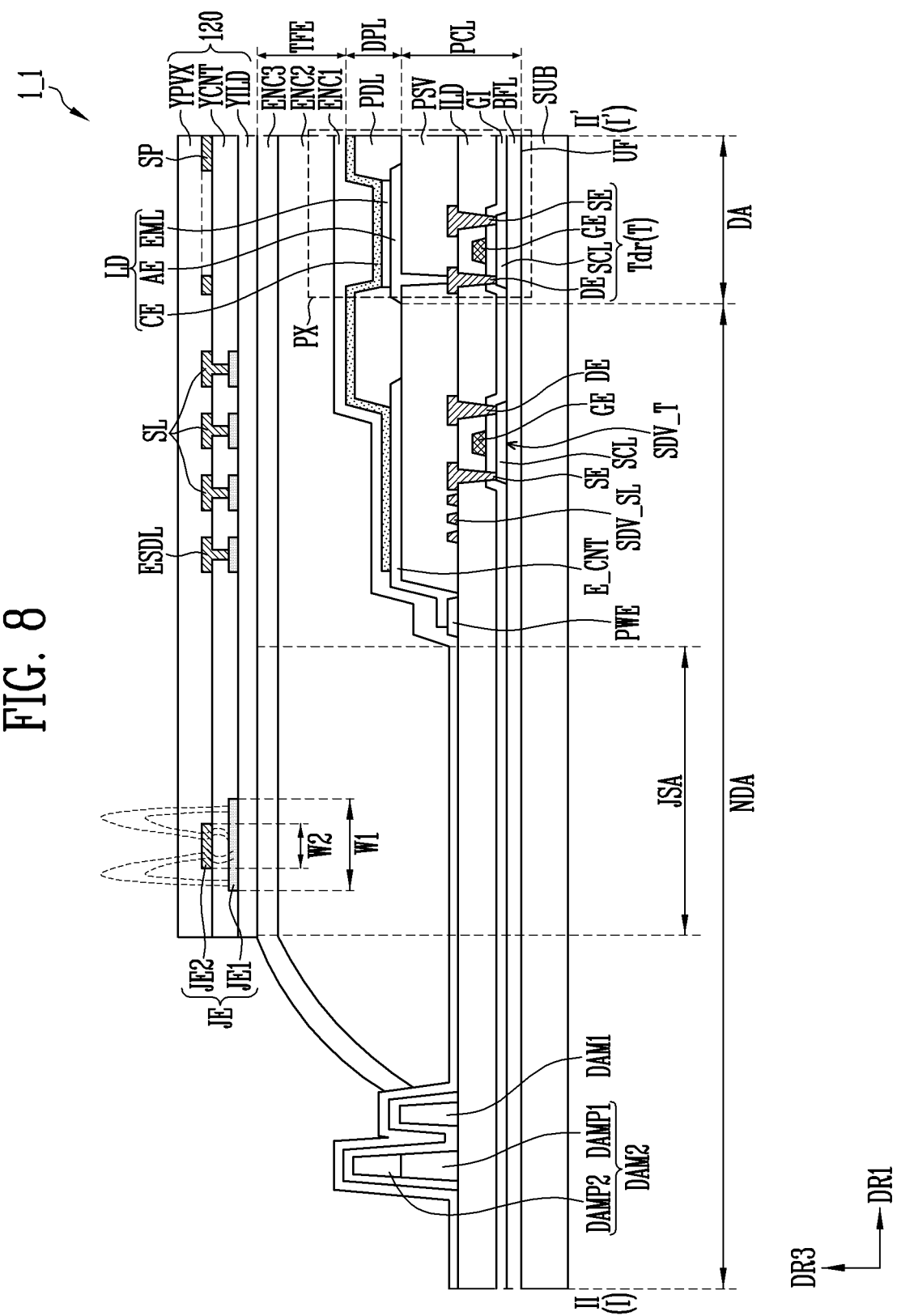
FIG. 8 is a cross-sectional view illustrating an embodiment of the display device taken along the line II-II' of FIG. 4 and the line I-I' of FIG. 3.

FIG. 8 is a cross-sectional view illustrating an embodiment of the display device taken along the line II-II' of FIG. 4 and the line I-I' of FIG. 3.

Referring to FIGS. 5 and 8, the display device 1_1 of FIG. 8 may be substantially equal or similar to the display device 1 of FIG. 5 except for the gesture sensor JE. Therefore, an overlapping description is not repeated.

In embodiments, the gesture sensor JE may include a first sensor electrode JE1 (or a driving electrode) and a second sensor electrode JE2 (or a sensing electrode) disposed on the first sensor electrode JE1.

In the gesture sensor area JSA, the first sensor electrode JE1 may be disposed on the base layer YILD and the second sensor electrode JE2 may be disposed on the first sensor insulating layer YCNT and may overlap the first sensor electrode JE1 in the third direction DR3. Each of the first sensor electrode JE1 and the second sensor electrode JE2 may include at least one of a metal material, a transparent conductive material, and various other conductive materials.

In an embodiment, one of the first sensor electrode JE1 and the second sensor electrode JE2 may be a driving electrode to which the driving signal is applied, and the other of the first sensor electrode JE1 and the second sensor electrode JE2 may be a sensing electrode that outputs the sensing signal. For example, the first sensor electrode JE1 may be the driving electrode and the second sensor electrode JE2 may be the sensing electrode. In this case, an electric field may be formed between the first sensor electrode JE1 and the second sensor electrode JE2, and the sensor driver 220 (refer to FIG. 1) may sense a change in the electric field generated when the object approaches (that is, a change in a capacitance between the sensor electrode JE1 and the second sensor electrode JE2), and may sense the proximity of the object and/or the motion of the object.

In an embodiment, in a plan view, a size or a width W1 of the first sensor electrode JE1 may be greater than a size or a width W2 of the second sensor electrode JE2. In this case, the electric field formed between the first sensor electrode JE1 and the second sensor electrode JE2 may be strongly formed in the third direction DR3 as compared to a case where the size of the first sensor electrode JE1 is less than or equal to the size of the second sensor electrode JE2. Accordingly, an object approaching in a front surface direction of the display device 1 (for example, in the third direction DR3) may be more easily sensed.

Meanwhile, the embodiment of FIG. 7 may also be applied to the embodiment of FIG. 8. For example, the sensor unit 120 may use at least a portion of the sensor pattern SP in addition to the first sensor electrode JE1 as the gesture driving electrode for detecting the proximity, the motion, and the like of the object. In other words, the sensor driver 220 (refer to FIG. 1) may apply the driving signal for detecting the proximity, the motion, and the like of the object to at least a portion of the sensor pattern SP as well as the first sensor electrode JE1. In this case, the sensor driver 220 (refer to FIG. 1) may sense the proximity, the motion, and the like of the object based on a total change in a capacitance between the first sensor electrode JE1 and the second sensor electrode JE2 and a capacitance between the at least the portion of the sensor pattern SP and the second sensor electrode JE2.

Figure 9:
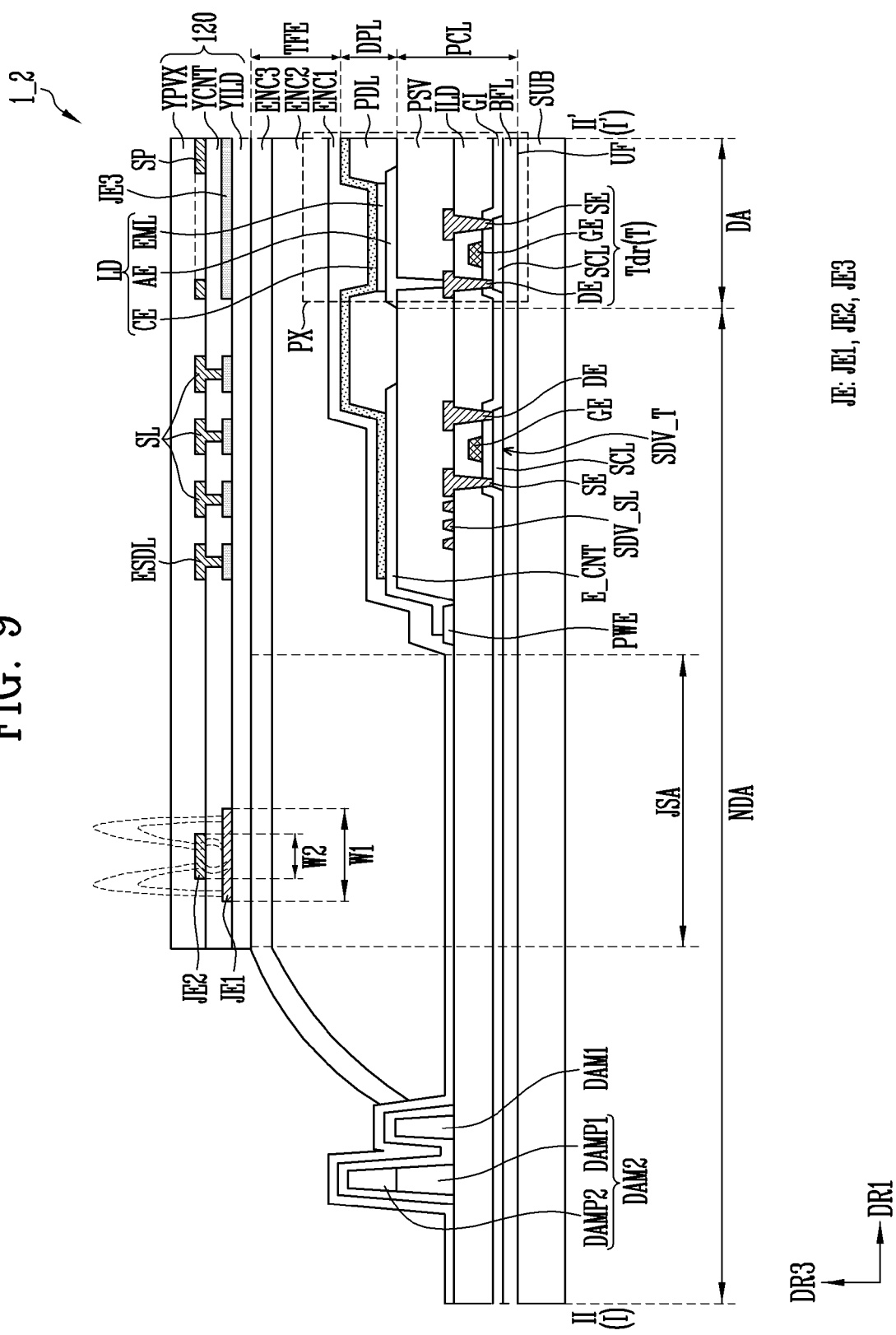
FIG. 9 is a cross-sectional view illustrating another embodiment of the display device taken along the line II-II' of FIG. 4 and the line I-I' of FIG. 3.
Figure 10:
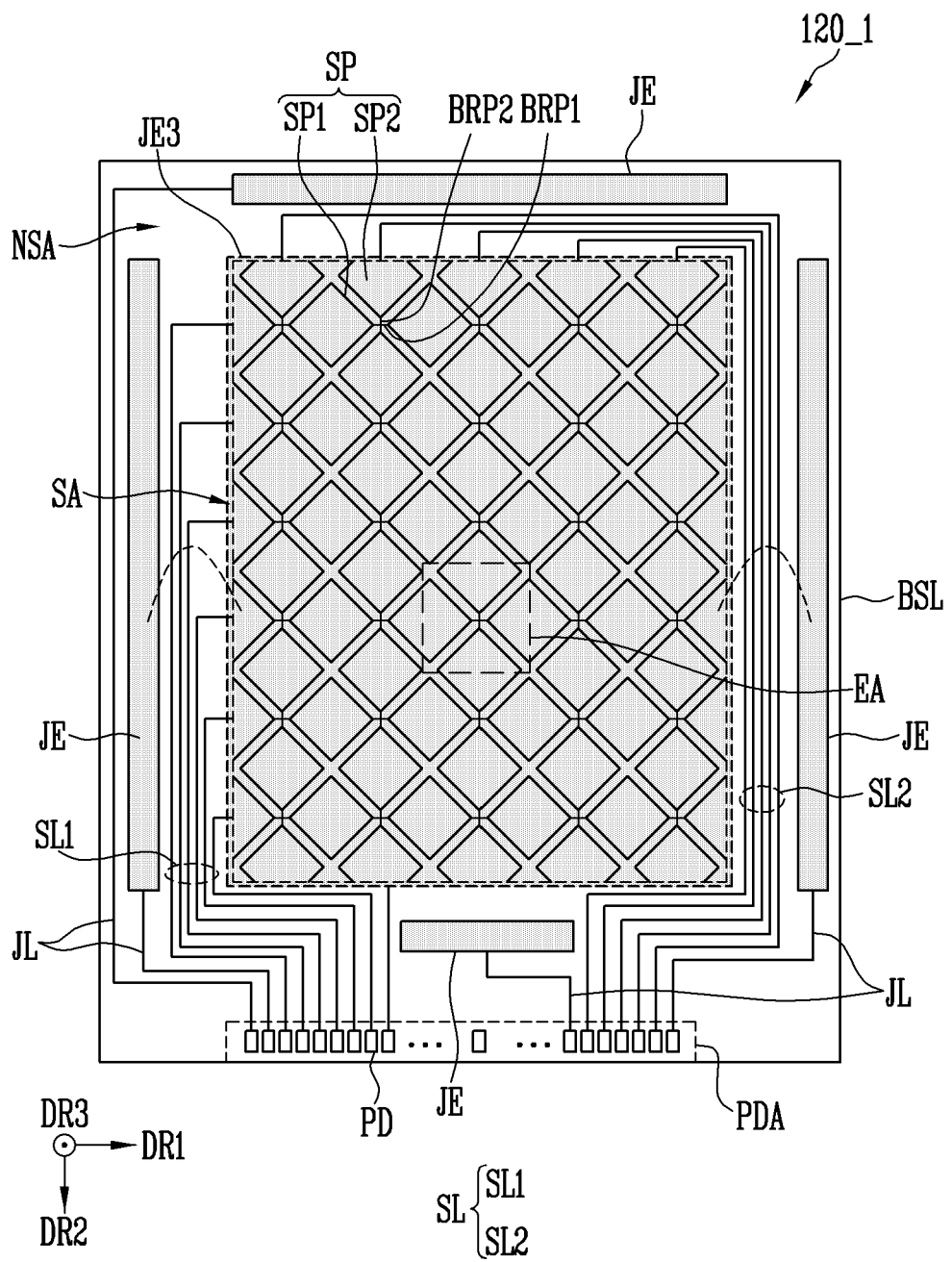
FIGS. 10 and 11 are plan views illustrating an embodiment of the sensor unit included in the display device of FIG. 9.
Figure 11:
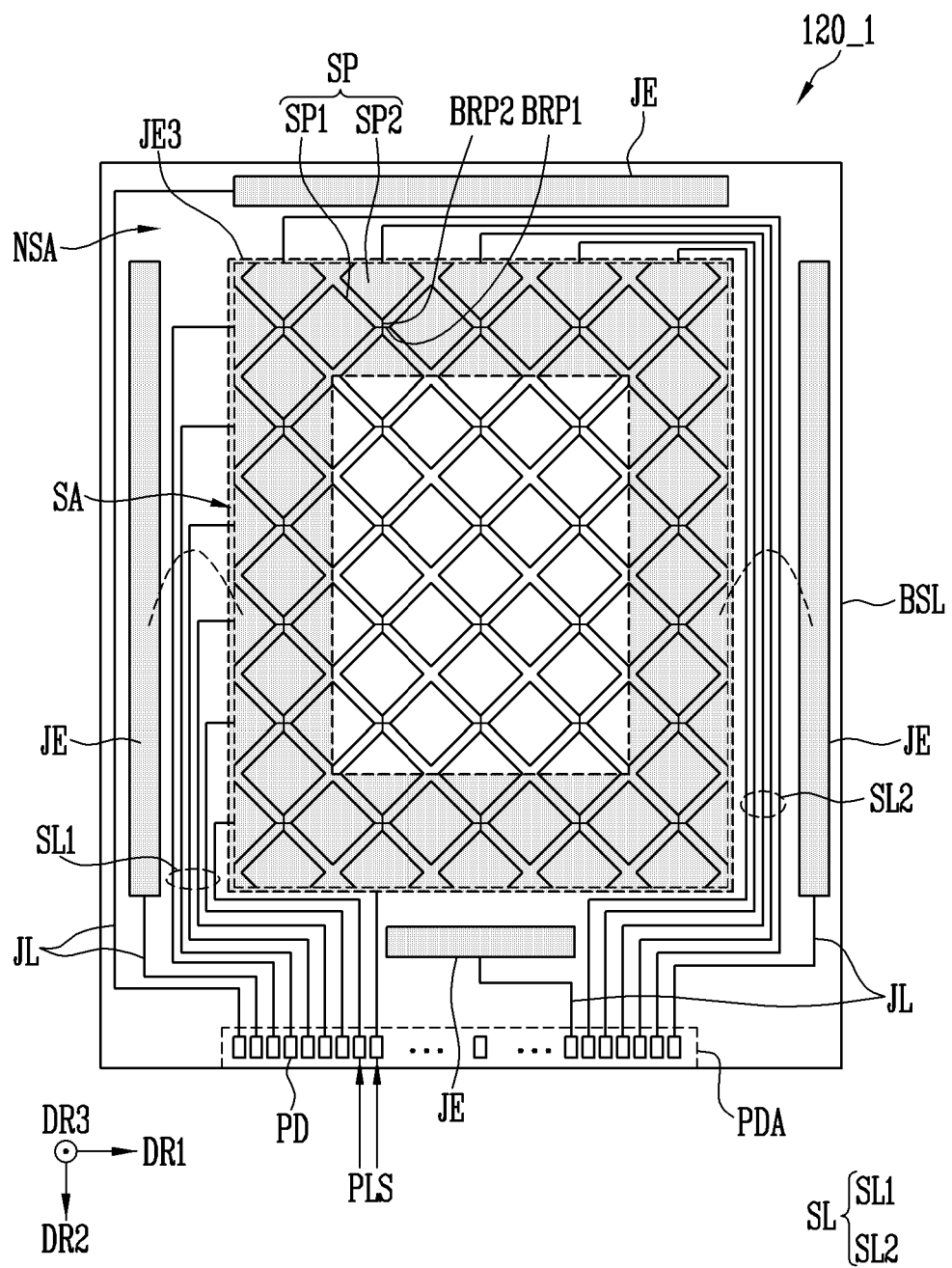
Figure 12:
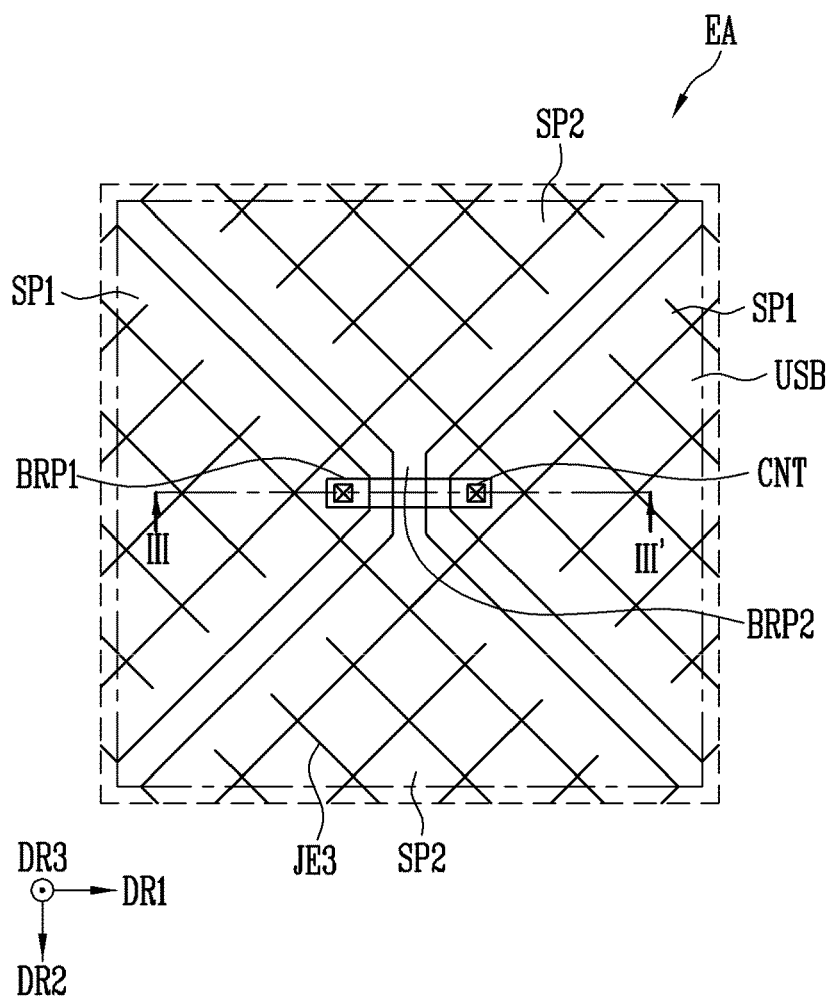
FIG. 12 is an enlarged schematic plan view of an EA portion of FIG. 10.
Figure 13:
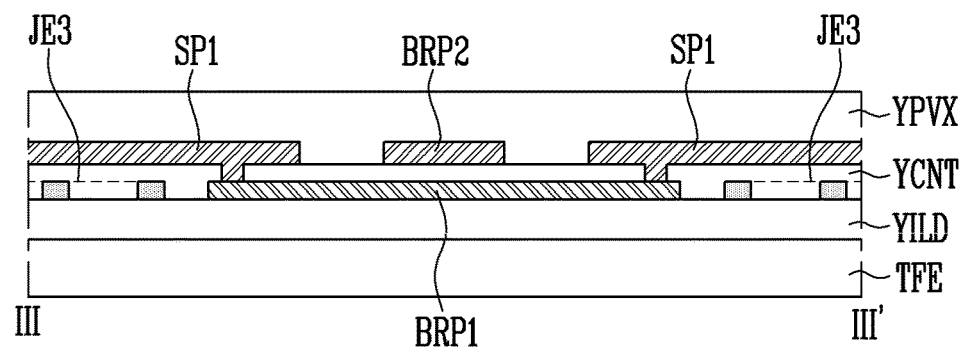
FIG. 13 is a cross-sectional view taken along a line III~III' of FIG. 12.
Figure 13:

FIG. 9 is a cross-sectional view illustrating another embodiment of the display device taken along the line II-II' of FIG. 4 and the line I-I' of FIG. 3. FIGS. 10 and 11 are plan views illustrating an embodiment of the sensor unit included in the display device of FIG. 9. FIGS. 10 and 11 show different embodiments related to a disposition of a third sensor electrode JE3. FIG. 12 is an enlarged schematic plan view of an EA portion of FIG. 10. FIG. 13 is a cross-sectional view taken along a line III~III' of FIG. 12.

Referring to FIGS. 8 and 9, except for the third sensor electrode JE3, the display device 1_2 of FIG. 9 may be substantially equal or similar to the display device 1_1 of FIG. 8. In addition, referring to FIGS. 4, 10, and 11, except for the third sensor electrode JE3, the sensor unit 120_1 of FIGS. 10 and 11 is equal or similar to the sensor unit 120 of FIG. 4. Therefore, an overlapping description is not repeated.

In embodiments, the gesture sensor JE may further include the third sensor electrode JE3 (a second driving electrode, or an auxiliary electrode) in addition to the first sensor electrode JE1 (or the first driving electrode) and the second sensor electrode JE2 (or the sensing electrode). The third sensor electrode JE3 may be disposed in the display area DA (or the touch sensing area SA) and may be spaced apart from the first sensor electrode JE1 positioned in the non-display area DA. The third sensor electrode JE3 may overlap the sensor pattern SP in the third direction DR3. For example, the third sensor electrode JE3 may be disposed under the sensor pattern SP. The third sensor electrode JE3 may block a capacitance from being formed between the sensor pattern SP and the second electrode CE. In other words, the third sensor electrode JE3 disposed under the sensor pattern SP may shield lower configuration including the second electrode CE, and prevent the lower configurations from affecting the sensor pattern SP.

In an embodiment, in a plan view, the third sensor electrode JE3 may be disposed on at least a portion of the touch sensing area SA. For example, as shown in FIG. 10, the third sensor electrode JE3 may be disposed in the entire touch sensing area SA as one electrode and may overlap all of the sensor patterns SP. As another example, as shown in FIG. 11, the third sensor electrode JE3 may be disposed only at an edge of the touch sensing area SA. As still another example, the third sensor electrode JE3 may be disposed in at least a portion of a remaining area except for the edge of the touch sensing area SA. A disposition of the third sensor electrode JE3 (or an area where the third sensor electrode JE3 is disposed) may be variously changed in consideration of a proximity sensing possible distance (a load, and the like) according to an electric field formed between the third sensor electrode JE3 and the second sensor electrode JE2.

The third sensor electrode JE3 may be electrically connected to one pad PD through a corresponding signal line. However, the disclosure is not limited thereto, and the third sensor electrode JE3 may be electrically connected to the gesture sensor JE (for example, the first sensor electrode JE1) of the non-display area through a corresponding line. The same signal may be applied to the third sensor electrode JE3 and the first sensor electrode JE1.

The third sensor electrode JE3 may be disposed on the base layer YILD. For example, the third sensor electrode JE3 may be formed through the same process as the first sensor electrode JE1 and may include the same material as the first sensor electrode JE1. However, the disclosure is not limited thereto. For example, as shown in FIG. 13, the third sensor electrode JE3 may be disposed on the same layer as the first bridge BRP1, may be formed through the same process as the first bridge BRP1, and may include the same material as the first bridge BRP1. For example, the third sensor electrode JE3 may include at least one of a metal material, a transparent conductive material, and various other conductive materials. For example, when the third sensor electrode JE3 includes a metal material, as shown in FIG. 12, the third sensor electrode JE3 may have a mesh structure including a plurality of conductive fine lines. In this case, the third sensor electrode JE3 may not overlap the light emitting element LD (refer to FIG. 9) in the third direction DR3 and may include an opening corresponding to the light emitting element LD. When the third sensor electrode JE3 includes a transparent conductive material, the third sensor electrode JE3 may overlap the light emitting element LD in the third direction DR3. Hereinafter, the third sensor electrode JE3 is described as having the mesh structure including the plurality of conductive fine lines.

Referring to FIGS. 12 and 13, in a plan view, the third sensor electrode JE3 may overlap the first and second sensor patterns SP1 and SP2, and may not be disposed in an area between the first and second sensor patterns SP1 and SP2. Portions of the third sensor electrode JE3 overlapping the first and second sensor patterns SP1 and SP2, respectively, may be connected to each other through a fine line disposed to surround the first and second bridges BRP1 and BRP2. However, the disclosure is not limited thereto, and the third sensor electrode JE3 may also be disposed in the area between the first and second sensor patterns SP1 and SP2.

In an embodiment, the sensor driver 220 (refer to FIG. 1) may apply a driving signal PLS (refer to FIG. 11) to the first sensor electrode JE1 and the third sensor electrode JE3. In this case, an electric field may be formed between the first sensor electrode JE1 and the second sensor electrode JE2 and between the third sensor electrode JE3 and the second sensor electrode JE2, and the sensor driver 220 (refer to FIG. 1) may sense the proximity of the object and/or the motion of the object based on a change in the electric field generated when the object approaches (that is, a total change in a capacitance between the first sensor electrode JE1 and the second sensor electrode JE2 and a capacitance between the third sensor electrode JE3 and the second sensor electrode JE2).

In another embodiment, as shown in FIG. 11, the sensor driver 220 (refer to FIG. 1) may apply the driving signal PLS to at least a portion of the third sensor electrode JE3 and the sensor pattern SP. In this case, the sensor driver 220 (refer to FIG. 1) may sense the proximity of the object and/or the motion of the object based on a total change of the capacitance between the first sensor electrode JE1 and the second sensor electrode JE2, the capacitance between the third sensor electrode JE3 and the second sensor electrode JE2, and a capacitance between at least the portion of the sensor pattern SP and the second sensor electrode JE2.

Figure 14:
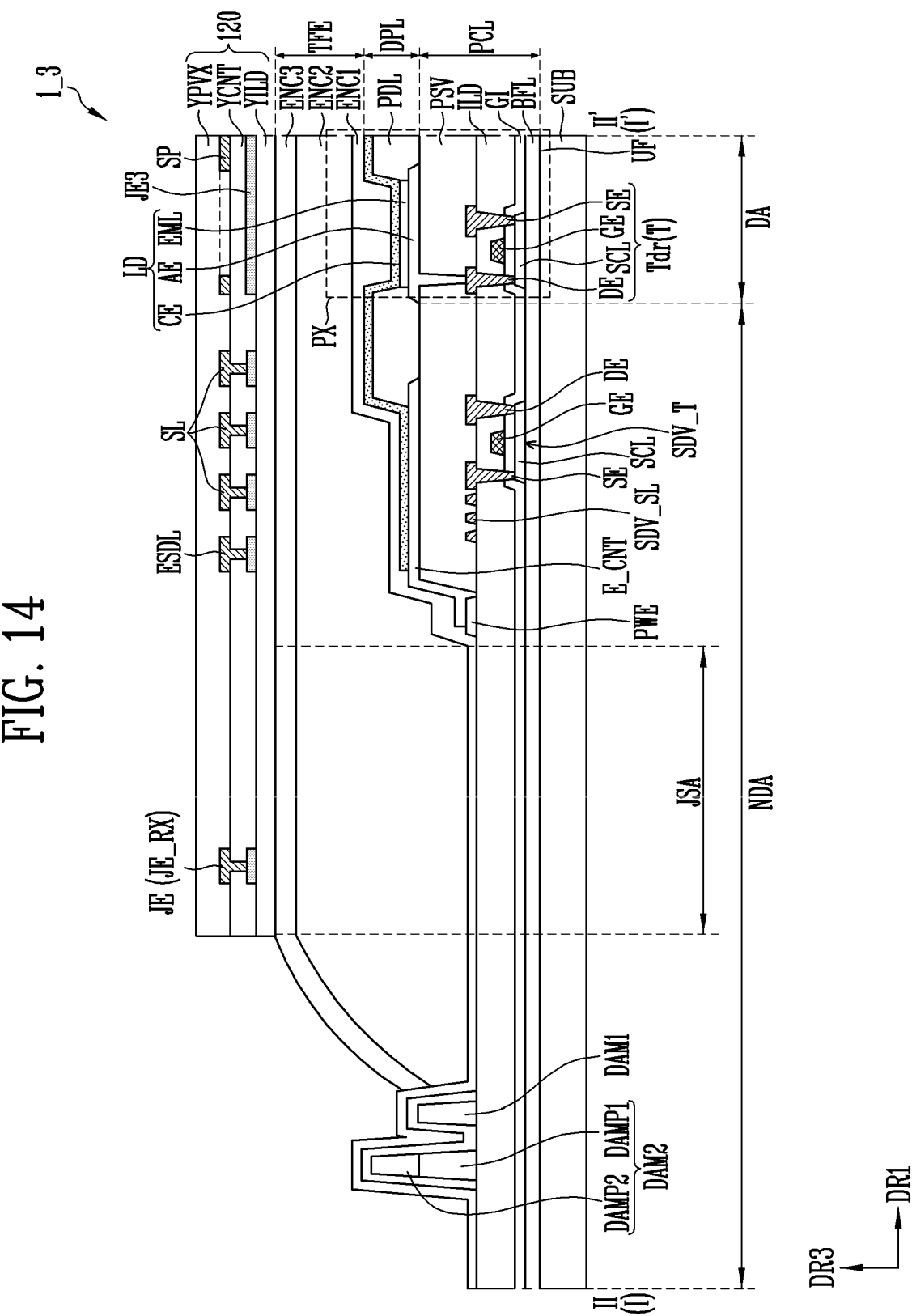
FIG. 14 is a cross-sectional view illustrating an embodiment of the display device taken along the line II-II' of FIG. 4 and the line I-I' of FIG. 3.

FIG. 14 is a cross-sectional view illustrating an embodiment of the display device taken along the line II-II' of FIG. 4 and the line I-I' of FIG. 3.

Referring to FIGS. 5 and 14, except for the third sensor electrode JE3, the display device 1_3 of FIG. 14 may be substantially equal or similar to the display device 1 of FIG. 5. In addition, referring to FIGS. 9 to 14, the third sensor electrode JE3 of FIG. 14 may be equal or similar to the third sensor electrode JE3 described with reference to FIGS. 9 to 13. Therefore, an overlapping description is not repeated.

In an embodiment, the sensor driver 220 (refer to FIG. 1) may apply the drive signal PLS (refer to FIG. 11) to the third sensor electrode JE3. In this case, the sensor driver 220 (refer to FIG. 1) may sense the proximity of the object and/or the motion of the object based on a change in a capacitance between the third sensor electrode JE3 and a gesture sensing electrode JE_RX.

In another embodiment, as described with reference to FIG. 11, the sensor driver 220 (refer to FIG. 1) may apply the driving signal PLS to the third sensor electrode JE3 and at least a portion of the sensor pattern SP. In this case, the sensor driver 220 (refer to FIG. 1) may sense the proximity of the object and/or the motion of the object based on a total change in a capacitance between the gesture sensing electrode JE_RX and the third sensor electrode JE3 and a capacitance between the gesture sensing electrode JE_RX and at least the portion of the sensor pattern SP.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of the disclosure is not limited to the details described in the detailed description of the specification, but should be defined by the claims. In addition, it is to be construed that all changes or modifications derived from the meaning and scope of the claims and equivalent concepts thereof are included in the scope of the disclosure.

What is claimed is:

1. A display device comprising:
a display layer including light emitting elements disposed on a substrate; and
a sensor disposed on the display layer,
wherein the sensor comprises:
touch electrodes;
sensing lines disposed outside the touch electrodes and electrically connected to the touch electrodes; and
a gesture sensor electrode disposed outside the sensing lines, and
wherein the gesture sensor electrode does not overlap a conductor which provide a constant voltage to the light emitting elements in a plan view.

2. The display device according to claim 1, wherein the touch electrodes and the sensing lines overlap the conductor which provide the constant voltage to the light emitting elements in a plan view.

3. The display device according to claim 2, wherein the conductor which provide the constant voltage to the light emitting elements is a cathode electrode of the light emitting elements or a power line electrically connected to the cathode electrode.

4. The display device according to claim 3, wherein the touch electrodes, the sensing lines, and the gesture sensor electrode are disposed on the same layer.

5. The display device according to claim 3, wherein the display layer further includes transistors,
wherein at least one of the transistors are electrically connected to the light emitting elements, and
wherein the cathode electrode and the power line are disposed between the transistors and the sensor to cover the transistors.

6. The display device according to claim 5, wherein, in a plan view, the gesture sensor electrode does not overlap the transistors.

7. The display device according to claim 3, wherein, in a plan view, the gesture sensor electrodes are respectively disposed on an upper side, a lower side, a left side, and a right side of a sensing area where the touch electrodes are disposed.

8. The display device according to claim 3, further comprising:
a sensing driver,
wherein the sensing driver senses proximity or motion of an object based on a change in a first capacitance between at least one of the touch electrodes and the gesture sensor electrode.

9. The display device according to claim 3, wherein the gesture sensor electrode includes a first sensor electrode and a second sensor electrode disposed on the first sensor electrode to overlap the first sensor electrode in a plan view.

10. The display device according to claim 9, wherein the second sensor electrode is completely overlapped with the first sensor electrode in a plan view.

11. The display device according to claim 9, further comprising:
a sensing driver,
wherein the sensing driver senses proximity or motion of an object based on a change in a second capacitance between the first sensor electrode and the second sensor electrode.

12. The display device according to claim 11, wherein the sensing driver applies the same signal to at least one of the touch electrodes and the first sensor electrode, and
wherein the sensing driver senses the proximity or the motion of the object based a total change in the second capacitance between the first sensor electrode and the second sensor electrode, and the first capacitance between at least one of the touch electrodes and the second sensor electrode.

13. The display device according to claim 9, wherein the sensor further includes an auxiliary electrode disposed under the touch electrodes and spaced apart from the first sensor electrode, and
wherein the same signal is applied to the auxiliary electrode and the first sensor electrode.

14. The display device according to claim 13, further comprising:
a sensing driver,
wherein the sensing driver senses proximity or motion of an object based on a total change in a second capacitance between the first sensor electrode and the second sensor electrode, and a third capacitance between the auxiliary electrode and the second sensor electrode.

15. The display device according to claim 13, wherein the auxiliary electrode is entirely disposed on the substrate as one electrode and overlaps all of the touch electrodes in a plan view.

16. The display device according to claim 13, wherein at least one of the touch electrodes are connected through a bridge, and wherein the auxiliary electrode is disposed on the same layer as the bridge.

17. A display device comprising:

a display layer disposed on a substrate and including transistors, light emitting elements, and a power line connected to a cathode electrode of the light emitting elements; and a sensor disposed on the display layer, wherein the sensor includes a gesture sensor electrode for sensing proximity or motion of an object, and wherein the gesture sensor electrode does not overlap the transistor, the cathode electrode, and the power line in a plan view.

18. The display device according to claim 17, wherein the gesture sensor electrode includes a first sensor electrode and a second sensor electrode disposed on the first sensor electrode to overlap the first sensor electrode in a plan view.

19. The display device according to claim 18, wherein the second sensor electrode is completely overlapped with the first sensor electrode in a plan view.

20. The display device according to claim 18, wherein the sensor further includes an auxiliary electrode spaced apart from the first sensor electrode and overlapping the cathode electrode in a plan view, and wherein the same signal is applied to the auxiliary electrode and the first electrode.

21. An electronic device comprising:

a processor; and a display device, the display device comprising:

a display layer including light emitting elements disposed on a substrate; and a sensor disposed on the display layer, wherein the sensor comprises:

touch electrodes;

sensing lines disposed outside the touch electrodes and electrically connected to the touch electrodes; and a gesture sensor electrode disposed outside the sensing lines, and wherein the gesture sensor electrode does not overlap a conductor which provide a constant voltage to the light emitting elements in a plan view.

* * * * *